(12) United States Patent
El-Shafei

(10) Patent No.: US 7,836,601 B2
(45) Date of Patent: Nov. 23, 2010

(54) METHODS OF CONTROLLING THE INSTABILITY IN FLUID FILM BEARINGS

(76) Inventor: Aly El-Shafei, 10, Road 263, New Maadi, Cairo 11435 (EG)

( * ) Notice: Subject to any disclaimer, the term of this patent is extended or adjusted under 35 U.S.C. 154(b) by 360 days.

(21) Appl. No.: 11/147,762

(22) Filed: Jun. 8, 2005

(65) Prior Publication Data

US 2005/0275300 A1  Dec. 15, 2005

Related U.S. Application Data

(60) Provisional application No. 60/579,866, filed on Jun. 15, 2004.

(51) Int. Cl.
 *B21K 1/76* (2006.01)
 *F16C 32/06* (2006.01)
(52) U.S. Cl. ............ 29/898.02; 29/898.07; 29/407.09; 29/407.1; 384/416; 384/117
(58) Field of Classification Search ............ 29/898.09, 29/898.1, 898.07, 898.02, 407.09, 407.1; 310/90.5; 384/105, 103, 104, 106, 117, 133, 384/134, 135, 192, 199, 308, 312, 416
See application file for complete search history.

(56) References Cited

U.S. PATENT DOCUMENTS

| | | | | |
|---|---|---|---|---|
| 3,360,309 A | * | 12/1967 | Voorhies | .............. 384/119 |
| 3,659,910 A | * | 5/1972 | Foster | .............. 384/119 |
| 3,969,804 A | | 7/1976 | MacInnes et al. | |
| 4,033,042 A | | 7/1977 | Bently | |
| 4,034,228 A | | 7/1977 | Arauner | |
| 4,247,155 A | * | 1/1981 | Fortmann | ................ 384/124 |
| 4,274,683 A | * | 6/1981 | Gray et al. | ................ 384/106 |
| 4,300,808 A | | 11/1981 | Yoshioka | |
| 4,415,281 A | | 11/1983 | Agrawal | |
| 4,502,795 A | * | 3/1985 | Klaass et al. | ............... 384/103 |
| 4,526,483 A | | 7/1985 | Hishikawa et al. | |
| 4,597,676 A | | 7/1986 | Vohr et al. | |

(Continued)

OTHER PUBLICATIONS

Z. Guo and R.G. Kirk, "Instabiility Boundary for Rotor-Hydrodynamic Bearing Systems, Part 1: Jeffcott Rotor With External Damping," ASME Journal of Vibration and Acoustics, Oct. 2003, p. 417-422.

(Continued)

*Primary Examiner*—Jermie E Cozart
(74) *Attorney, Agent, or Firm*—Dennis G. LaPointe

(57) ABSTRACT

A method of controlling the instability in fluid film bearings by using a magnetic bearing in combination with a fluid film bearing (whether it is a cylindrical journal bearing, an elliptic bearing, an offset-half bearing, a multi-lobe bearing, foil bearing or a tilting-pad bearing, does not really matter), wherein the fluid film bearing serves as the primary load carrying bearing and the magnetic bearing controls the instability of the fluid film bearing. This efficient combination results in bearings that can be used at high speeds without having neither stability nor reliability problems. An alternative method of controlling the instability in fluid film bearings is to disturb the flow in the axial direction, for example, a sleeve journal) bearing can be manufactured such that the bearing axis is skewed with the shaft axis or a variable geometry bearing can be manufactured to allow for bearing angular misalignment.

70 Claims, 21 Drawing Sheets

U.S. PATENT DOCUMENTS

| | | | |
|---|---|---|---|
| 4,767,223 A | | 8/1988 | Goodwin |
| 4,827,169 A | * | 5/1989 | Habermann ............... 310/90.5 |
| 4,828,403 A | | 5/1989 | Schwartzman |
| 4,880,320 A | | 11/1989 | Haines et al. |
| 4,961,122 A | | 10/1990 | Sakai et al. |
| 5,032,028 A | | 7/1991 | Riazuelo et al. |
| 5,096,309 A | | 3/1992 | Nakasugi et al. |
| 5,104,284 A | * | 4/1992 | Hustak et al. ............... 415/105 |
| 5,126,612 A | * | 6/1992 | Girault ..................... 310/90.5 |
| 5,142,177 A | * | 8/1992 | Higuchi et al. ............. 310/90.5 |
| 5,201,585 A | | 4/1993 | Gans et al. |
| 5,321,329 A | * | 6/1994 | Hovorka ................... 310/90.5 |
| 5,322,371 A | | 6/1994 | Signoret |
| 5,345,127 A | * | 9/1994 | New ........................ 310/90.5 |
| 5,480,234 A | | 1/1996 | Chen et al. |
| 5,489,155 A | | 2/1996 | Ide |
| 5,516,212 A | | 5/1996 | Titcomb |
| 5,531,523 A | | 7/1996 | Subbiah |
| 5,549,392 A | | 8/1996 | Anderson |
| 5,634,723 A | | 6/1997 | Agrawal |
| 5,660,481 A | * | 8/1997 | Ide ............................. 384/122 |
| 5,743,654 A | | 4/1998 | Ide et al. |
| 5,743,657 A | | 4/1998 | O'Reilly et al. |
| 5,772,334 A | | 6/1998 | Parkins et al. |
| 5,879,076 A | | 3/1999 | Cross |
| 5,879,085 A | * | 3/1999 | Ball et al. .................. 384/307 |
| 5,915,841 A | * | 6/1999 | Weissert .................... 384/104 |
| 5,977,677 A | * | 11/1999 | Henry et al. .............. 310/90.5 |
| 6,089,756 A | | 7/2000 | Ono et al. |
| 6,168,403 B1 | * | 1/2001 | Bush ........................ 418/55.1 |
| 6,190,048 B1 | * | 2/2001 | Weissert .................... 384/103 |
| 6,224,263 B1 | * | 5/2001 | Saville et al. ............... 384/106 |
| 6,353,273 B1 | | 3/2002 | Heshmat |
| 6,606,536 B1 | | 8/2003 | Aso |
| 6,653,756 B2 | | 11/2003 | Ueyama et al. |
| 6,686,674 B2 | * | 2/2004 | Ichiyama ..................... 310/90 |
| 6,703,736 B2 | | 3/2004 | Wang et al. |
| 6,707,200 B2 | | 3/2004 | Carroll |
| 6,717,311 B2 | | 4/2004 | Locke |
| 6,720,695 B2 | | 4/2004 | Coenen |
| 6,727,617 B2 | | 4/2004 | McMullen et al. |
| 6,737,777 B2 | | 5/2004 | Werfel et al. |
| 6,749,339 B1 | * | 6/2004 | Murabe et al. .............. 384/100 |
| 6,758,381 B2 | * | 7/2004 | Tanaka et al. ............... 226/194 |
| 6,948,853 B2 | * | 9/2005 | Agrawal ..................... 384/105 |
| 2002/0174734 A1 | * | 11/2002 | Chinery ......................... 74/60 |

OTHER PUBLICATIONS

Z. Guo and R.G. Kirk, "Instabiility Boundary for Rotor-Hydrodynamic Bearing Systems, Part 2: Rotor With external Flexible Damped Support," ASME Journal of Vibration and Acoustics, Oct. 2003, p. 423-426.

D. D. Fuller, "Theory and Practice of Lubrication for Engineers," 2nd ed., John Wiley & Sons, 1984 (New York).

Y. Hori, "A Theory of Oil Whip," Journal of Aplied Mechanics, 1959, p. 189-198.

A. Muszynska, "Fluid-related Rotor/Bearing Stability Problems," Bentley Rotor Dynamics Research Corporation Report, Aug. 1986.

A. Muszynska, "Multi-Mode Whirl and Whip in Rotor/Bearing Systems," 2nd International Sympposium on Transport Phenomena, Dynamics, and Design of Rotating Machinery, Honolulu, Hawaii, USA, Apr. 4-6.

K. Matsuda, Y. Kanemitsu and S. Kijimoto, "Optimal Clearance Configuration of Fluid-Film Journal Bearings for Stability Improvement," ASME Journal of Tribology, Jan. 2004, p. 125-131.

* cited by examiner

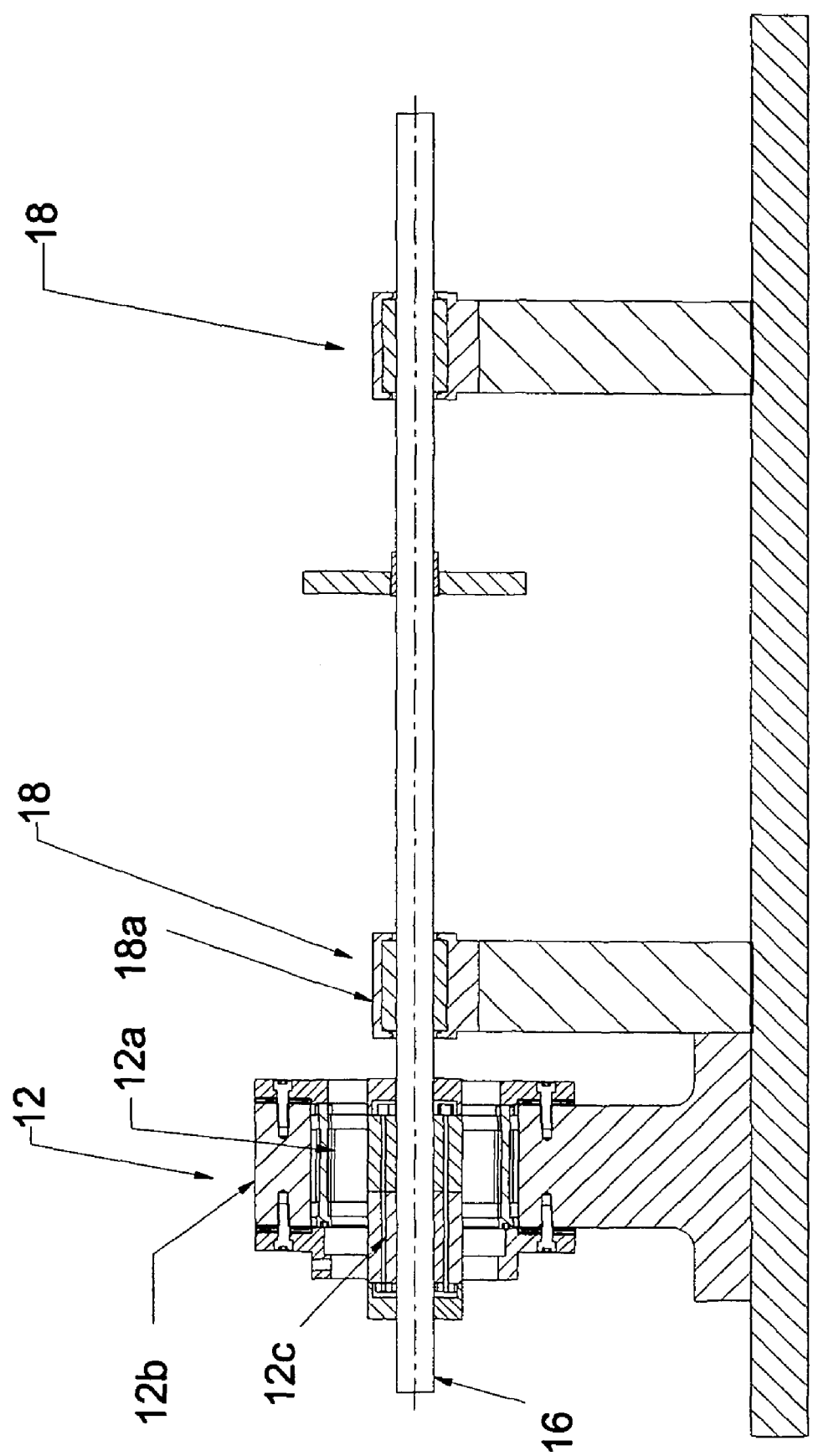

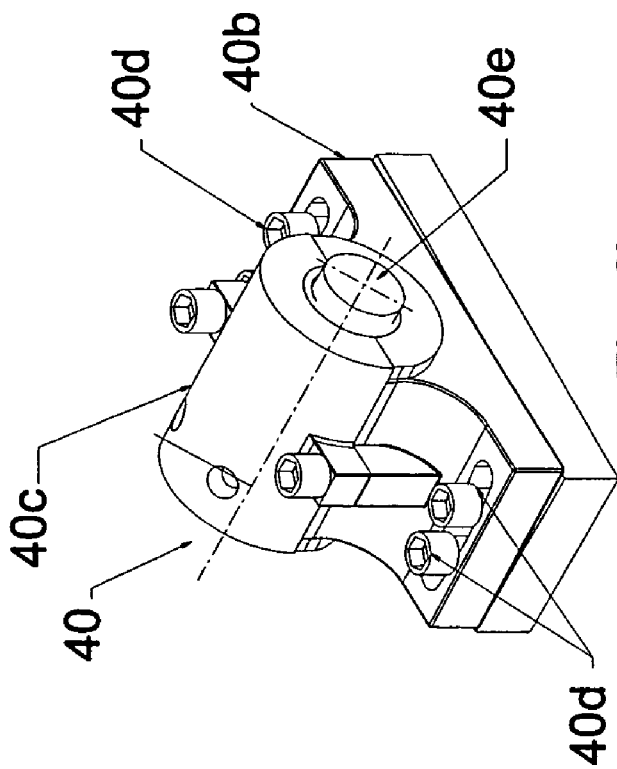
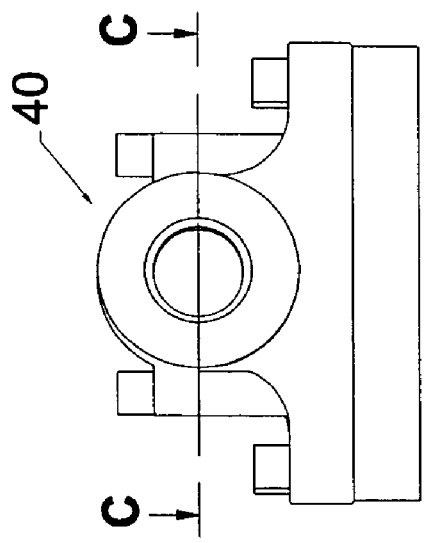
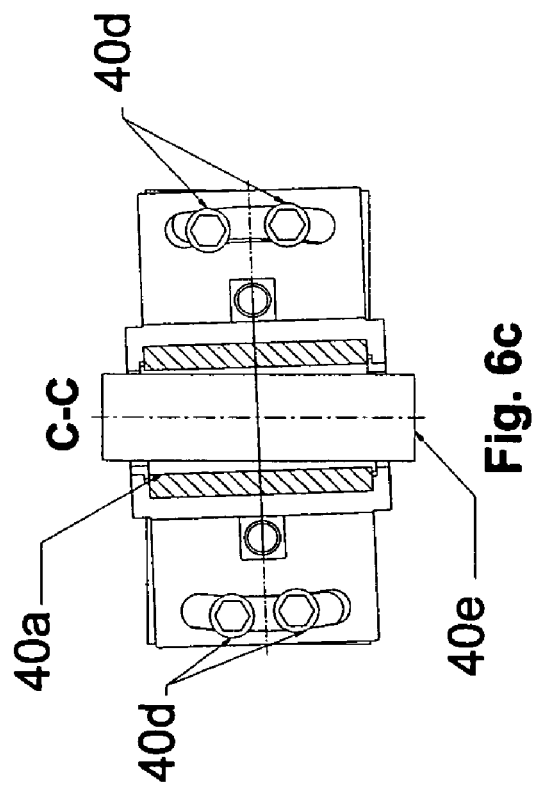

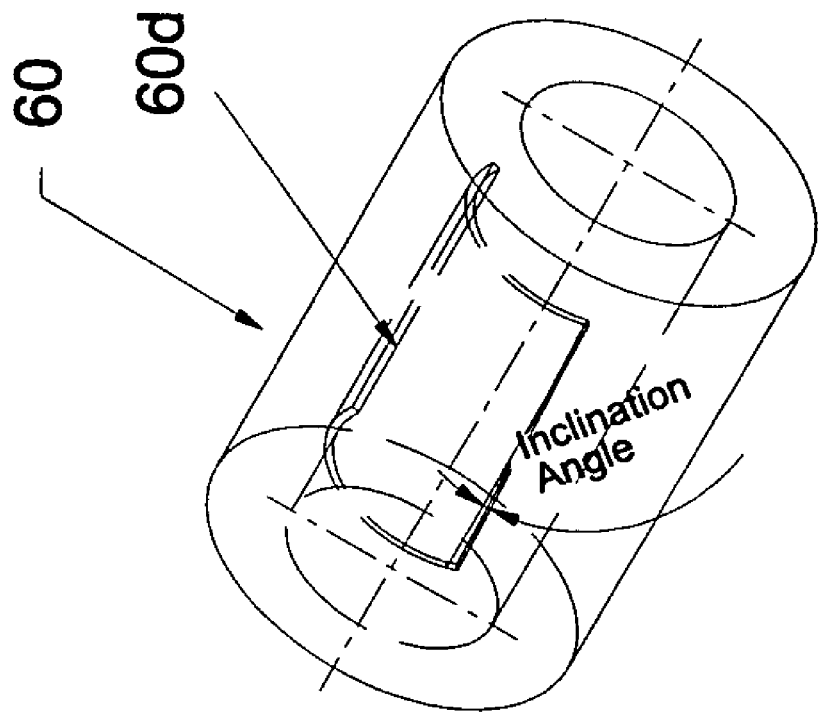
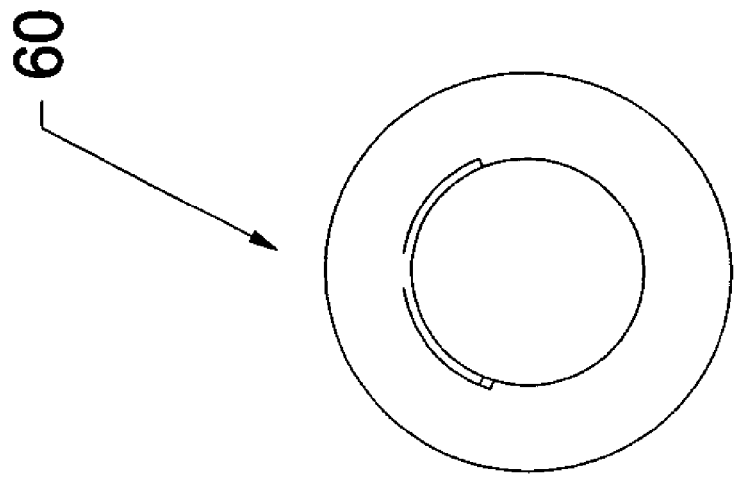
Fig. 8d

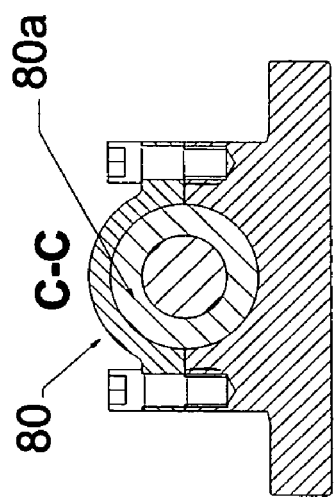
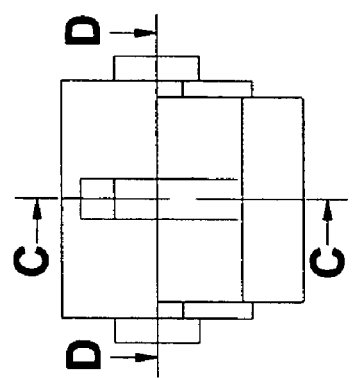
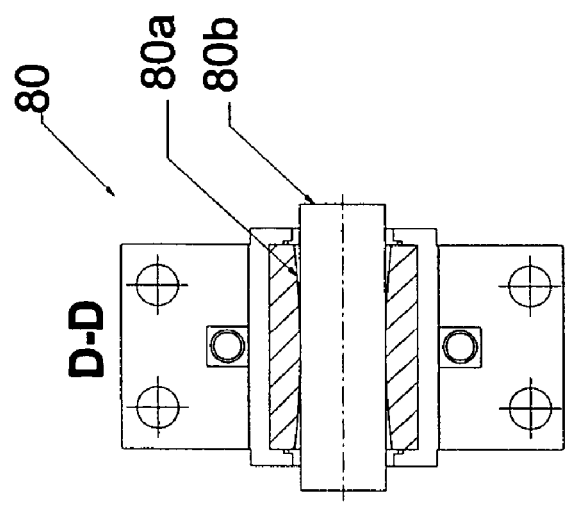

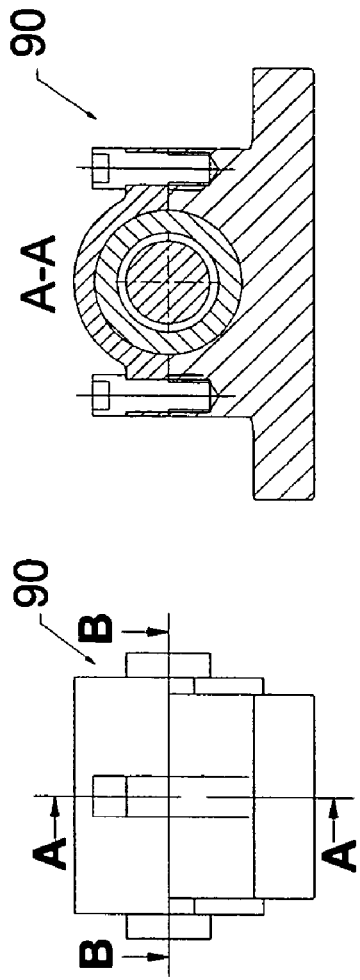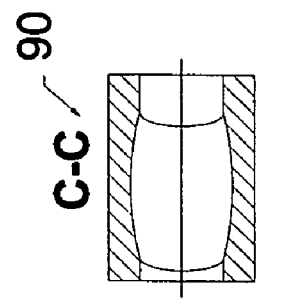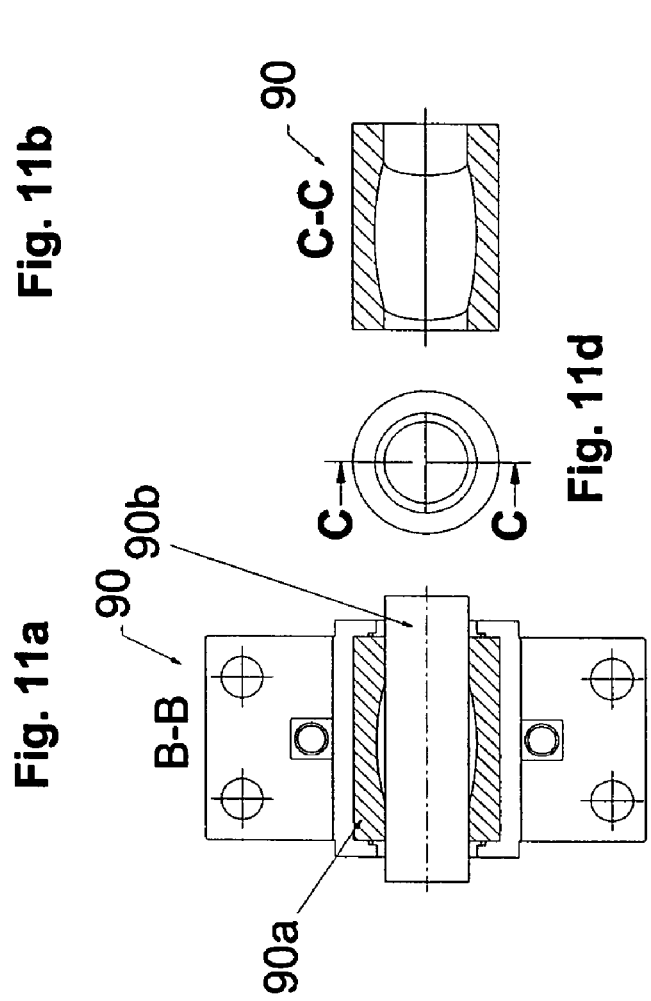

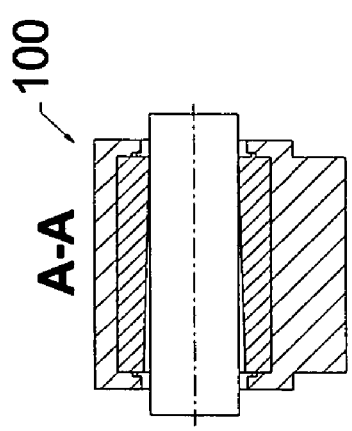
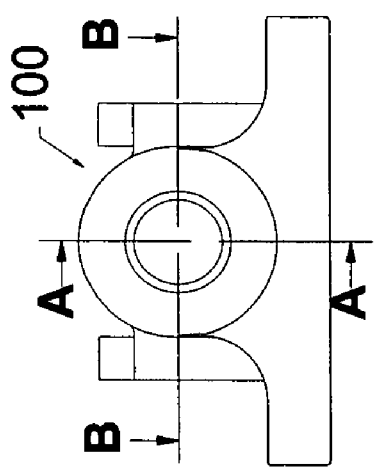
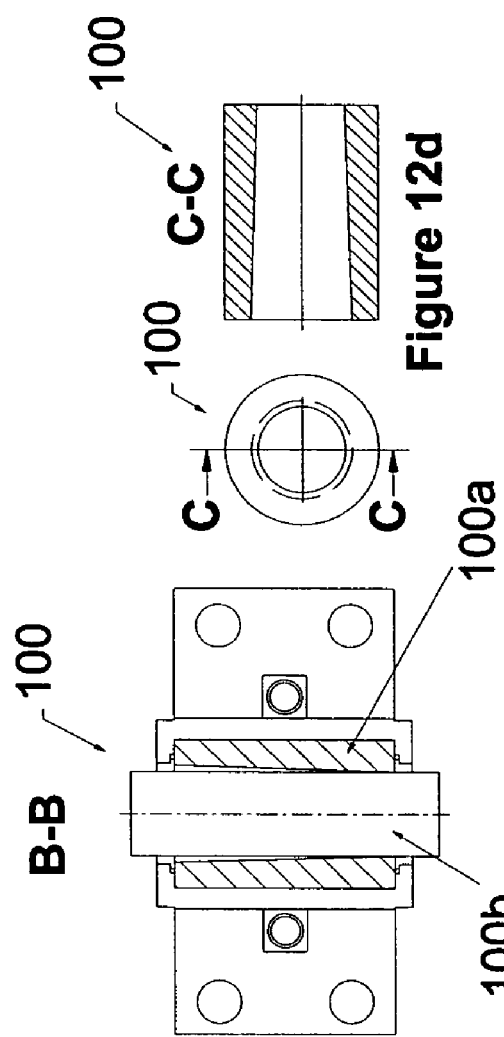
Fig. 12a
Fig. 12b
Fig. 12c
Figure 12d

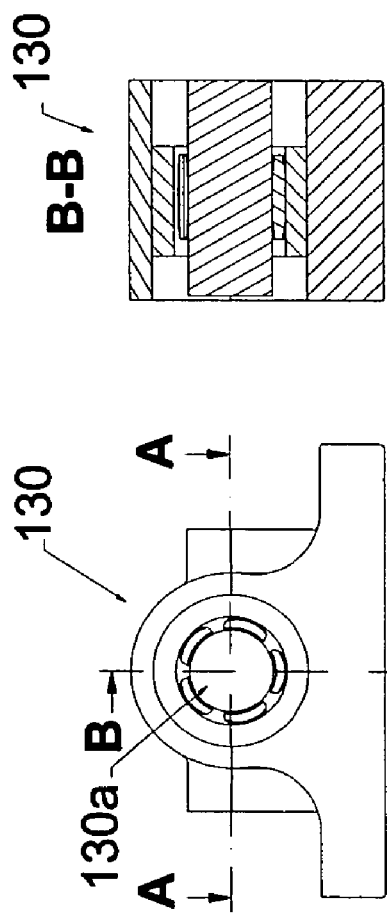
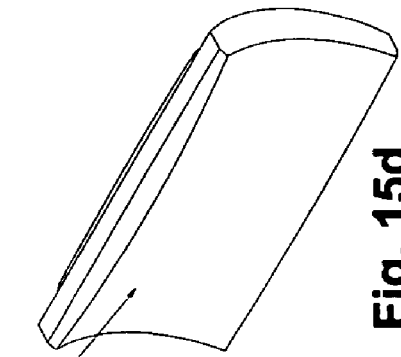
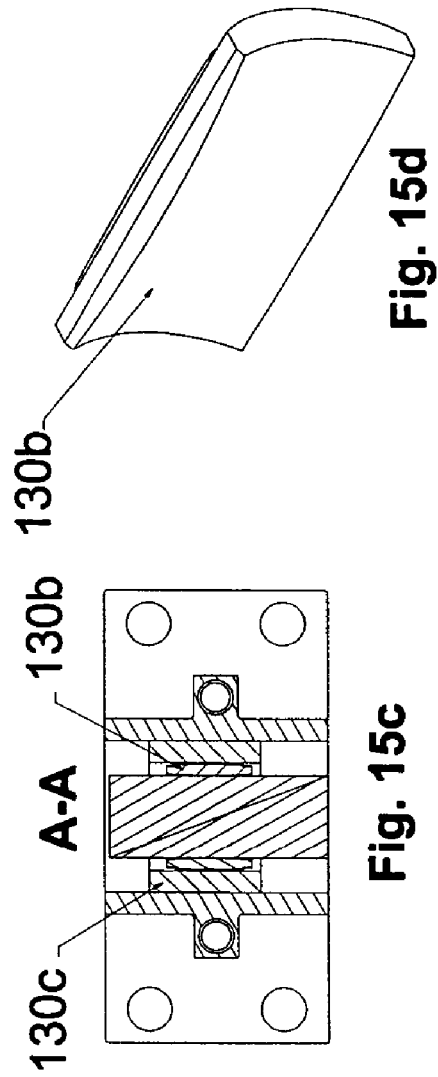
Fig. 15b
Fig. 15d
Fig. 15a
Fig. 15c

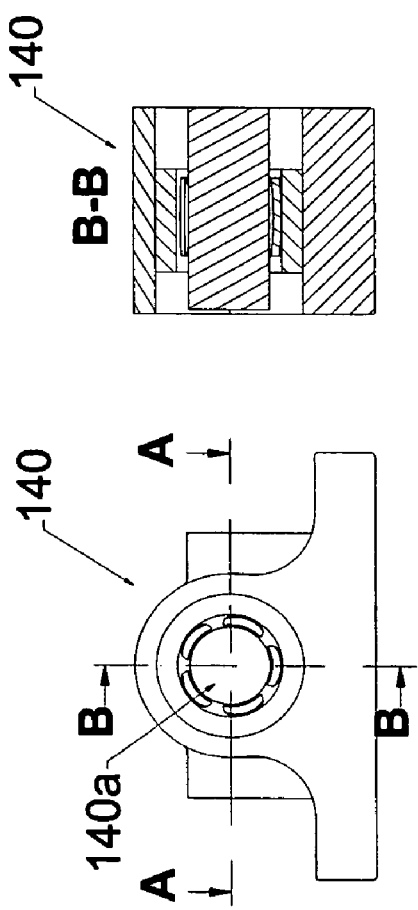
Fig. 16a
Fig. 16b
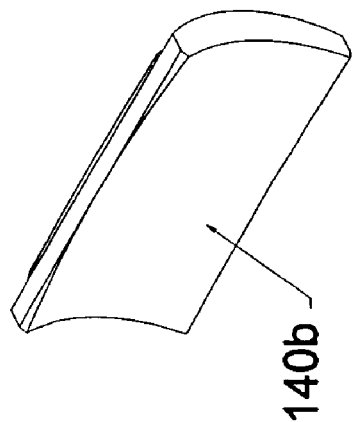
Fig. 16c
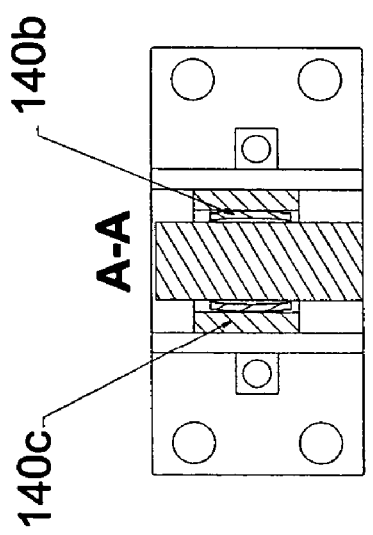
Fig. 16d

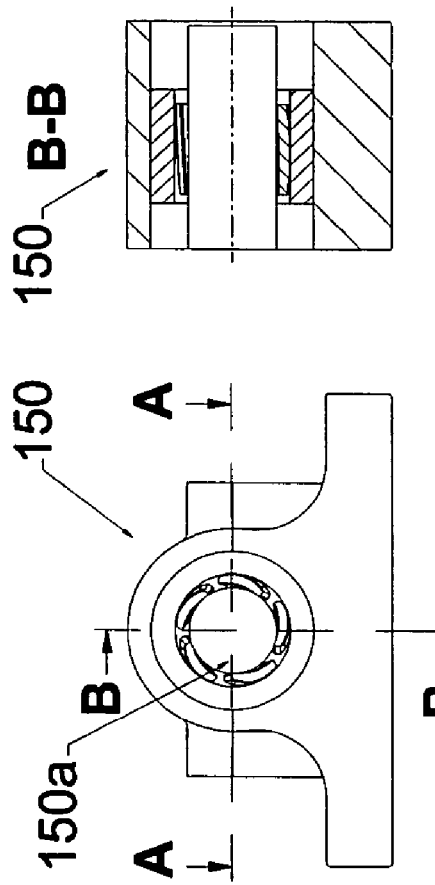
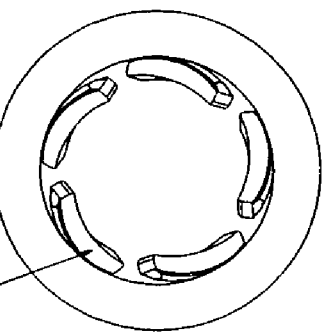
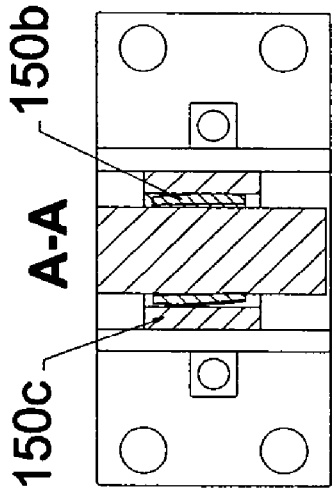
Fig. 17a
Fig. 17b
Fig. 17c
Fig. 17d

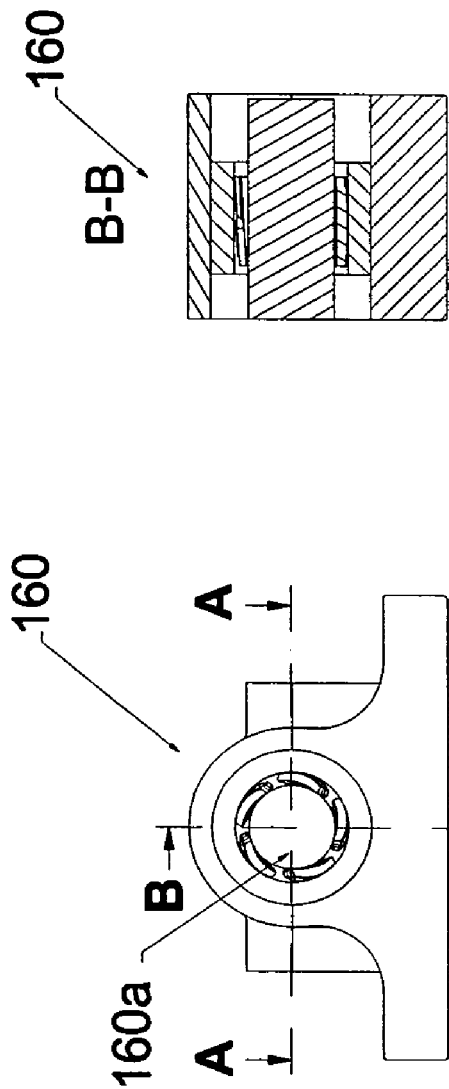
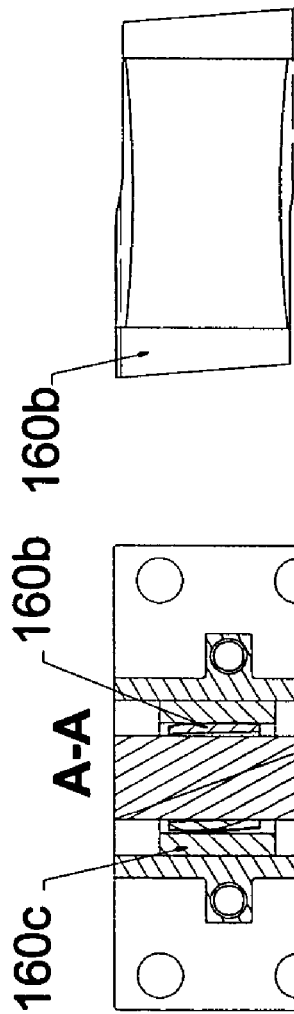
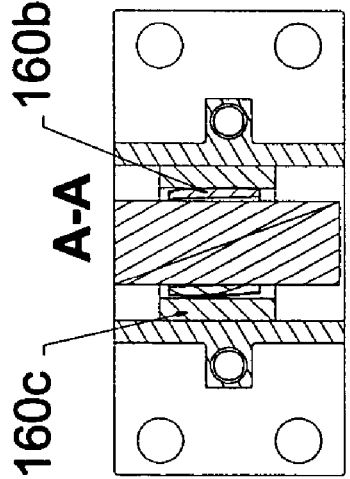
Fig. 18a
Fig. 18b
Fig. 18c
Fig. 18d

METHODS OF CONTROLLING THE INSTABILITY IN FLUID FILM BEARINGS

RELATED APPLICATION

This application claims the priority benefit of U.S. Provisional Patent Application Ser. No. 60/579,866 filed Jun. 15, 2004

FIELD OF THE INVENTION

This invention is related to fluid film bearings, in particular, to controlling well known instability in fluid film bearings by using magnetic bearings and by using a unique method involving the use of an intentional misaligned journal in the bearing.

BACKGROUND OF THE INVENTION

A unique feature of rotor vibration is the presence of a rotor, which by definition has to rotate, sometimes at very high speeds, to allow the machine to conduct its function. This rotation has two major implications. One implication is that a huge amount of kinetic energy is stored in the rotating machine. If a mechanism allows some of this energy to be transferred from the rotation to the rotor vibration, this would certainly lead to instability of the machine. Some mechanisms that allow this energy transfer and result in instability of rotating machines are: internal damping, aerodynamic cross coupling, seals, high speed journal bearings, intershaft squeeze film dampers, etc.

The other implication of rotation is the perpetual presence of an exciting force on the rotating machine. There is always some residual unbalance in the rotor; this residual unbalance forces the rotor at different speeds and possibly excites the critical speeds.

The presence of these two unique features of rotor vibrations: instability and unbalance excitation, result in the need to control rotor vibrations. If left uncontrolled, the unbalance excitation may result in excessive transmitted force; the critical speeds may result in excessive vibration amplitude, while instability may result in machine destruction.

Since the early work of Rankine, who suggested that machines would never be able to cross critical speeds, major strides have occurred in the development of rotor-bearing systems. Nowadays, high speed-high performance rotating machines such as gas turbines, compressors, steam turbines, turbo expanders, and turbochargers, etc., routinely cross as many as six critical speeds during their normal operating procedures.

To control the vibration of such high-speed machines, many turbomachinery manufacturers resort to either passive or active vibration control. Perhaps the first method of vibration control was the introduction of fluid film bearings in the late nineteenth century. The first application of "non-contact" journal bearings was hailed as a major breakthrough at the time, with suggestions that this should lead to the solution of all rotating machinery problems. However, soon thereafter the problems of journal bearings and fluid film bearings in general became apparent. Two basic characteristics obscured the success of fluid film bearings. One is the tendency of journal bearings to cause oil whirl and oil whip, which can be destructive instability mechanisms in rotor-bearing systems. This led to the introduction of more sophisticated fluid film bearings such as the elliptic bearing, offset-half bearing, pressure dam bearing, multi-lobe bearing and tilting pad bearing, and more recently the foil bearing. These fluid film bearings provide progressively improved stability characteristics, at the cost of lower load carrying capacity and reduced damping at critical speeds.

The second problem with fluid film bearings is their speed dependent characteristics. The stiffness and damping properties of fluid film bearings depend on the Sommerfeld number, which is a nondimensional speed/load factor. The difficulty of determining accurate stiffness and damping properties of fluid film bearings is prevalent up to the present time, both due to the difficulty of the CFD calculations using Finite Difference and Finite Element Methods, as well as the speed dependent properties which affect the prediction of critical speeds of rotors mounted on fluid film bearings.

Large, heavy rotors have to use fluid film bearings because of the load carrying capacity. However, smaller and faster rotors are mounted on rolling element bearings. Unfortunately, rolling element bearings, do not provide any vibration control, because of their high stiffness and virtually no damping characteristics. This did not cause problems with smaller machines, such as electric motors, but with the advent of gas turbine jet engines, which necessitated the use of high speed, light rotors, it became apparent that aircraft engines need a method of vibration control. Fluid film bearings were eliminated as a possible control method in aircraft engines because of the instability mechanisms of oil whip, which would be destructive for high-speed engines.

The time was ripe in the nineteen sixties for the introduction of the squeeze film damper and soft support as a method for passive vibration control. The squeeze film damper is an oil film surrounding the outer race of a rolling element bearing which is constrained from rotation but allowed to vibrate. Thus, it can be classified as a class of fluid film bearings, without the load carrying capacity or the instability caused by rotation. The squeeze film damper allowed the designer of aircraft engines to introduce damping to the rotating machine as a method of vibration control. In addition, the introduction of the soft support allowed judicial placement of the critical speeds. Thus the combination of the squeeze film damper and soft support provided the designer with stiffness and damping to control the rotor vibration passively.

In the nineteen eighties, researchers started toying with the idea of using magnetic bearings as supports for rotating machines. This opened the door for active control of rotating machine vibration, because of the possibility of actively controlling the stiffness and damping properties of magnetic bearings through the control of the current to the bearings. In addition, it is somewhat natural to consider active control of electromagnetic systems, due to the ease of interface with control system components.

A wealth of research exists in the literature on the active control of rotating machinery using magnetic bearings. Actually, it is the inventor's personal belief that magnetic bearings, despite their various shortcomings, are probably the best method available to control rotor vibration in land based applications.

The magnetic bearings can provide continuously variable stiffness and damping properties for active vibration control, add to that the non-contact characteristics, as well as a large load carrying capacity and the possibility of using an oil free machine, and it becomes clear that magnetic bearings are probably the best choice for the support and active control of rotating machine vibrations.

However, magnetic bearings have various shortcomings. These include: the cost of magnetic bearings, which are considerably more expensive than conventional bearings; the cost of failure, which probably would mean complete replacement of the machine; the weight of the large bearings and associated controls; the sensitivity of magnetic bearings to high temperatures; the need to establish their reliability, as well as the need to establish a parallel support system, called a "catcher-bearing", to carry the rotor in case of failure.

These shortcomings affect the application of magnetic bearings in aircraft engines, and to date, with over twenty years of aggressive research and development, no magnetic bearings have been introduced in aircraft engines. However, many rotating machines, particularly retrofit compressors, have been employed using magnetic bearings in the field and have shown considerable success.

History of Fluid Film Bearing Instability.

In an excellent paper, Y. Hori in 1959 provided a theory of oil whip, and described the history of fluid film bearing instability. According to Hori, the phenomena of oil whirl and oil whip were first reported in 1925. Although it has been three quarters of a century since the instability has been reported, yet this subject is still of current interest. G. Kirk in 2003 explained that this interest lies essentially in answering the following two questions: "Are there any possibilities that the rotor system can transgress the threshold speed? Can the rotor system operate above this threshold speed?". These two questions are also the motivation for this work presented herein, in addition to the need to understand the parameters that influence the onset of instability.

Perhaps the interest in studying the stability of fixed geometry fluid film bearing lies in its historical significance. They allowed the development of rotating machines in the nineteenth century. Actually, in his book on the theory of lubrication, D. D. Fuller suggests that the fluid film bearing is probably the single most important element in the recent technological development, only comparable in its significance to the effect of electricity. Early fluid film bearings were designed to carry the loads, and were hailed as low-friction devices possibly capable of continuously carrying the machine. However, with the increased speed of rotating machines in the twentieth century, it became evident that the journal bearing itself can cause the problems of oil whirl and oil whip. This has caused many researchers to investigate, experimentally and theoretically, the phenomena of oil whirl and oil whip.

In his paper, Hori's main result was to explain the experimental results reported at that time. Hori reports that B. L. Newkirk and J. F. Lewis in 1956 reported experimental cases in which the rotating speed reached five or six times the first critical speed before the instability occurred, while O. Pinkus in 1953 and 1956 reported cases where whipping disappeared and resumed again, and cases of stable and unstable states separated by regions of transient whip. According to Hori, Newkirk and Pinkus experiments were contradictory in many senses; even on the effect of temperature. Newkirk and Lewis reported that hotter oil provides a greater range of stable operation, while the Pinkus experiments reported in 1956 showed that cooler oil provides a greater range of stable operation. Y. Hori in 1959 provided a theory of oil whip, trying to explain the gap between Newkirk and Pinkus.

Since then, in the sixties and seventies, significant work on alternative fluid film bearing designs to control the instability were conducted. Moreover, significant efforts went into calculating linearized bearing coefficients and in predicting rotor dynamic response.

In the eighties, renewed interest in the journal bearing instability was triggered. A. Muszynska performed extensive testing on journal bearing supported rotors. She illustrated the presence of second mode whirl. Also, in the eighties, major advances in understanding the nonlinear dynamics of journal bearings through bifurcation analysis and Hopf Bifurcation were made.

SUMMARY OF THE INVENTION

One embodiment of the present invention is a combined magnetic-fluid film bearing; another embodiment is a stable fluid film bearing.

Combined Magnetic-Fluid Film Bearing:

As discussed in the background, the magnetic bearings are probably the best support for rotating machines. However, their shortcomings, essentially concerning reliability, preclude their usage in many applications, particularly in aircraft engines. Also, as discussed above, fluid film bearings have stability problems, that preclude their use in high speed applications.

The invention actually relies on the advantages and shortcomings of both devices. The invention is to use a fluid film bearing (whether it is a cylindrical journal bearing, an elliptic bearing, an offset-half bearing, a multi-lobe bearing, or a tilting-pad bearing, does not really matter) as a primary load carrying bearing, and to use a magnetic bearing in combination with the fluid film bearing to control the instability. This should be quite an efficient combination, where the combination results in bearings that can be used at high speeds without having neither stability nor reliability problems.

Many patents cover magnetic bearings, e.g.,

| | |
|---|---|
| 6,737,777 | Magnetic bearing and use thereof; |
| 6,727,617 | Method and apparatus for providing three axis magnetic bearing having permanent magnets mounted on radial pole stock; |
| 6,720,695 | Rotor spinning device with a contact less, passive, radial bearing for the spinning rotor; |
| 6,717,311 | Combination magnetic radial and thrust bearing; |
| 6,707,200 | Integrated magnetic bearing; |
| 6,703,736 | Magnetic bearing; |
| 6,653,756 | Magnetic bearing device; and |
| 6,606,536 | Magnetic bearing device and magnetic bearing control device. |

However, none of these patents discuss the use of magnetic bearings as a means of controlling journal bearings instability. Actually, most of the state-of-the-art, and the current development efforts in magnetic bearings, are for the use of magnetic bearings as a primary load carrying element, and to use the excess control action to provide some desirable stability benefits in rotating machines.

Also, many patents cover fluid film bearings, e.g.,

| | |
|---|---|
| 6,089,756 | Plain bearing; |
| 5,879,085 | Tilt pad hydrodynamic bearing for rotating machinery; |
| 5,879,076 | Tilt pad hydrodynamic bearing for rotating machinery; |
| 5,772,334 | Fluid film bearings; |
| 5,743,657 | Tilting pad journal bearing; |
| 5,743,654 | Hydrostatic and active control movable pad bearing; |
| 5,634,723 | Hydrodynamic fluid film bearings; |
| 5,549,392 | Shaft seal for hydrodynamic bearing unit; |
| 5,531,523 | Rotor journal bearing having adjustable bearing pads; |
| 5,516,212 | Hydrodynamic bearing with controlled lubricant pressure distribution; |
| 5,489,155 | Tilt pad variable geometry bearings, having tilting bearing pads and methods of making same; |
| 5,480,234 | Journal bearing; |
| 5,322,371 | Fluid film bearing; |
| 5,201,585 | Fluid film journal bearing with squeeze film damper for turbo machinery; |

-continued

| | |
|---|---|
| 5,096,309 | Hydrodynamic bearing system; |
| 5,032,028 | Fluid film bearing; |
| 4,961,122 | Hydrodynamic grooved bearing device; |
| 4,828,403 | Resiliently mounted fluid bearing assembly; |
| 4,880,320 | Fluid film journal bearings; |
| 4,767,223 | Hydrodynamic journal bearings; |
| 4,597,676 | Hybrid bearing; |
| 4,526,483 | Fluid foil bearing; |
| 4,415,281 | Hydrodynamic fluid film bearing; |
| 4,300,808 | Tilting-pad bearings; |
| 4,034,228 | Tilting pad bearing; and |
| 3,969,804 | Bearing housing assembly method for high speed rotating shafts. |

However, none of these patents suggest the use of magnetic bearings as a means of controlling fluid film instabilities.

Actually, the development of magnetic bearings and the development of fluid film bearings are two completely separate items, and investigators in both areas do not appreciate the developments in the other area, as if they are two different islands.

U.S. Pat. No. 6,353,273, Hybrid foil-magnetic bearing is an exception. In that invention, it is suggested that both the foil bearing and the magnetic bearing are used as load carrying elements. It is possible to do so to carry large load, such that each of the foil bearing and the magnetic bearing carry part of the load. However, in the opinion of this inventor, that is not a good solution. The hybrid foil-magnetic bearing, although capable of operating at high speeds, still suffers from the same disadvantages of magnetic bearings.

Although fluid film bearings and magnetic bearings are well known devices, yet it is not obvious that they can be used in a combined form, since the current technology is that these are competing devices not complementing devices. Both are considered load carrying devices that have certain control capabilities (passive control for fluid film bearings and active control for magnetic bearings). It is thus an invention to consider the magnetic bearing only as a controlling device, and the fluid film bearing as only a load carrying device. Their combined effect is to have bearings with the advantages of large load carrying capacity, excellent reliability, and use at high speeds without instability, in addition to all the known advantages of fluid film bearings and magnetic bearings. Moreover, an additional advantage will appear, since the magnetic bearing is not used as a load carrying element, the power requirements will be reduced, and thus smaller, lighter magnetic bearings can be used that can control the rotor vibrations reliably.

This combination can take the form of two adjacent or non-adjacent bearings, one fluid film bearing and the other magnetic bearing, or it can have the form of one integral bearing having the fluid film bearing within the magnetic bearing, such that the fluid for the fluid film bearing passes over the rotor of the magnetic bearing, and within the clearance between the rotor and stator in the magnetic bearing.

However, in this case a design issue will appear, since the magnetic bearing will require a large clearance to dissipate generated heat, and the fluid film bearing will require a small clearance to improve load carrying capacity. This design issue can be tackled in two ways, one is to select a compromise clearance between the two conflicting requirements, and the other is to use a small clearance for load carrying in the fluid film bearing, and use an increased fluid flow to dissipate the generated heat in the magnetic bearing.

Stable Fluid Film Bearing:

As discussed in the previous pages, fluid film bearings have an instability problem called oil whirl and oil whip. Many patents describe methods to design fluid film bearings that are more stable, for example:

| | |
|---|---|
| 6,089,756 | Plain bearing |
| 5,879,085 | Tilt pad hydrodynamic bearing for rotating machinery |
| 5,879,076 | Tilt pad hydrodynamic bearing for rotating machinery |
| 5,772,334 | Fluid film bearings |
| 5,743,657 | Tilting pad journal bearing |
| 5,743,654 | Hydrostatic and active control movable pad bearing |
| 5,634,723 | Hydrodynamic fluid film bearings |
| 5,549,392 | Shaft seal for hydrodynamic bearing unit |
| 5,531,523 | Rotor journal bearing having adjustable bearing pads |
| 5,516,212 | Hydrodynamic bearing with controlled lubricant pressure distribution |
| 5,489,155 | Tilt pad variable geometry bearings, having tilting bearing pads and methods of making same |
| 5,480,234 | Journal bearing |
| 5,322,371 | Fluid film bearing |
| 5,201,585 | Fluid film journal bearing with squeeze film damper for turbo machinery |
| 5,096,309 | Hydrodynamic bearing system |
| 5,032,028 | Fluid film bearing |
| 4,961,122 | Hydrodynamic grooved bearing device |
| 4,828,403 | Resiliently mounted fluid bearing assembly |
| 4,880,320 | Fluid film journal bearings |
| 4,767,223 | Hydrodynamic journal bearings |
| 4,597,676 | Hybrid bearing |
| 4,526,483 | Fluid foil bearing |
| 4,415,281 | Hydrodynamic fluid film bearing |
| 4,300,808 | Tilting-pad bearings |
| 4,034,228 | Tilting pad bearing |
| 3,969,804 | Bearing housing assembly method for high speed rotating shafts |

However, all these patents, including the tilting pad bearing, which is the most stable fluid film bearing, all have a common feature, that is to disturb the flow in the circumferential direction to control the instability (or, in case of the foil bearing, use resilience in series with the fluid film). In fact, ASME Journal of Tribology, Vol. 126, pp. 125-131 (2004) describes a study for obtaining the optimal clearance configuration in the circumferential direction to improve the stability characteristics of fluid film bearings. Yet no one thought of trying to disturb the flow in the axial direction to control the instability.

The inventor herein has conducted experiments where angular misalignment at the coupling virtually eliminated the instability in cylindrical journal bearings, which are notorious for having instability problems. These experiments were reported in a paper presented by the inventor herein at the Proceedings of ASME Turbo Expo, Vienna, Austria, paper GT-2004-53644, which is incorporated by reference herein. A pre-publication copy of this paper was filed and integrated into U.S. provisional patent application U.S. 60/579,866 filed Jun. 15, 2004 from which, this application claims priority benefit. This is in contrast to the current technology, where having the precise alignment at the coupling is considered to be good practice for all rotating machines. In fact, U.S. Pat. No. 4,033,042, entitled "Shaft alignment apparatus and method" describes techniques to improve alignment between rotors at the coupling.

The invention described herein is quite simple and straightforward. The idea is to disturb the flow in the axial direction, thus improving the instability. In its simplest form, a sleeve (journal) bearing is manufactured such that the bearing axis is skewed with the shaft axis. Thus the shaft axis is straight horizontally, while the bearing axis is tilted in the vertical direction, with a predetermined slope. One end is lower than the shaft axis, while the other end is higher than the shaft axis. The same invention applies for a fixed geometry bearing, but in the horizontal direction. The bearing axis is tilted sideways (to the right) thus presenting a predetermined horizontal misalignment at the bearing.

In another embodiment, a variable geometry bearing allows for bearing angular misalignment. The basic idea is quite simple. Suppose the predetermined slope for the bearings is not known beforehand, and requires adjustment in the field. In this case, consider a simple cylindrical journal bearing, where the fixing bolts are allowed a certain passageway such that it is possible to skew the whole cylindrical journal bearing (or any type fluid bearing) whereby the bearing axis has a certain slope to the shaft axis, and this slope is adjustable. When the appropriate slope is selected, the fixing bolts are used to fix the bearing body (and the passageway) to the skid or pedestal.

The above described embodiments are the simplest forms of the invention and are further supported by the experiments described in the above mentioned technical paper presented at the Proceedings 2004 ASME Turbo Expo Power for Land, Sea and Air on Jun. 15, 2004.

However, this invention opens the door to many other possibilities in designing fluid film bearings. This includes the introduction of two offset halves of the bearing, just by simply introducing a skewness between the upper and lower portions (this is in contrast to the current technology where the offset halves are offset horizontally). Other embodiments include introducing elliptic, multi-lobe, pressure dam, and tilting pads in the axial rather than the circumferential directions as current technology implies. Any possibility of modifying or disturbing the flow along the axis of the bearing for controlling oil whirl and oil whip is an embodiment of this invention.

BRIEF DESCRIPTION OF THE DRAWINGS

In the accompanying drawings:

FIG. 1 is an elevation view of one embodiment of the invention depicting the adjacent magnetic-journal bearing support of a rotor, showing a cross-sectional view of the embodiment;

FIG. 2b is a detailed view of detail B taken from FIG. 2a;

FIGS. 6a-6c collectively depict the tilting housing bearing embodiment of the invention;

FIGS. 8a-8d collectively depict the inclined pressure dam bearing embodiment of the invention;

FIGS. 10a-10c collectively depict the converging-diverging bearing assembly embodiment of the invention;

FIGS. 11a-11d collectively depict the diverging-converging bearing assembly embodiment of the invention;

FIGS. 12a-12d collectively depict the convergent bearing embodiment of the invention;

FIGS. 15a-15d show a tilting pad bearing assembly with a Divergent-Convergent pad that rocks on the bearing axially, and/or has an axial Divergent-Convergent profile;

FIGS. 16a-16d show a tilting pad bearing assembly with a Convergent-Divergent pad that rocks on the bearing axially, and/or has an axial Convergent-Divergent profile;

FIGS. 17a-17d show a tilting pad bearing assembly with an axially twisted pad; and FIGS. 18a-18d show a tilting pad bearing assembly with an axially stepped pad.

DETAILED DESCRIPTION OF THE INVENTION

The invention is a method of controlling the instability in fluid film bearings by using a magnetic bearing in combination with a fluid film bearing (whether it is a cylindrical journal bearing, an elliptic bearing, an offset-half bearing, a multi-lobe bearing, foil bearing or a tilting-pad bearing, does not really matter), wherein the fluid film bearing serves as the primary load carrying bearing and the magnetic bearing controls the instability of the fluid film bearing. This efficient combination results in bearings that can be used at high speeds without having neither stability nor reliability problems. An alternative method of controlling the instability in fluid film bearings is to disturb the flow in the axial direction, for example, a sleeve journal) bearing can be manufactured such that the bearing axis is skewed with the shaft axis or a variable geometry bearing can be manufactured to allow for bearing angular misalignment.

Figure 2A:
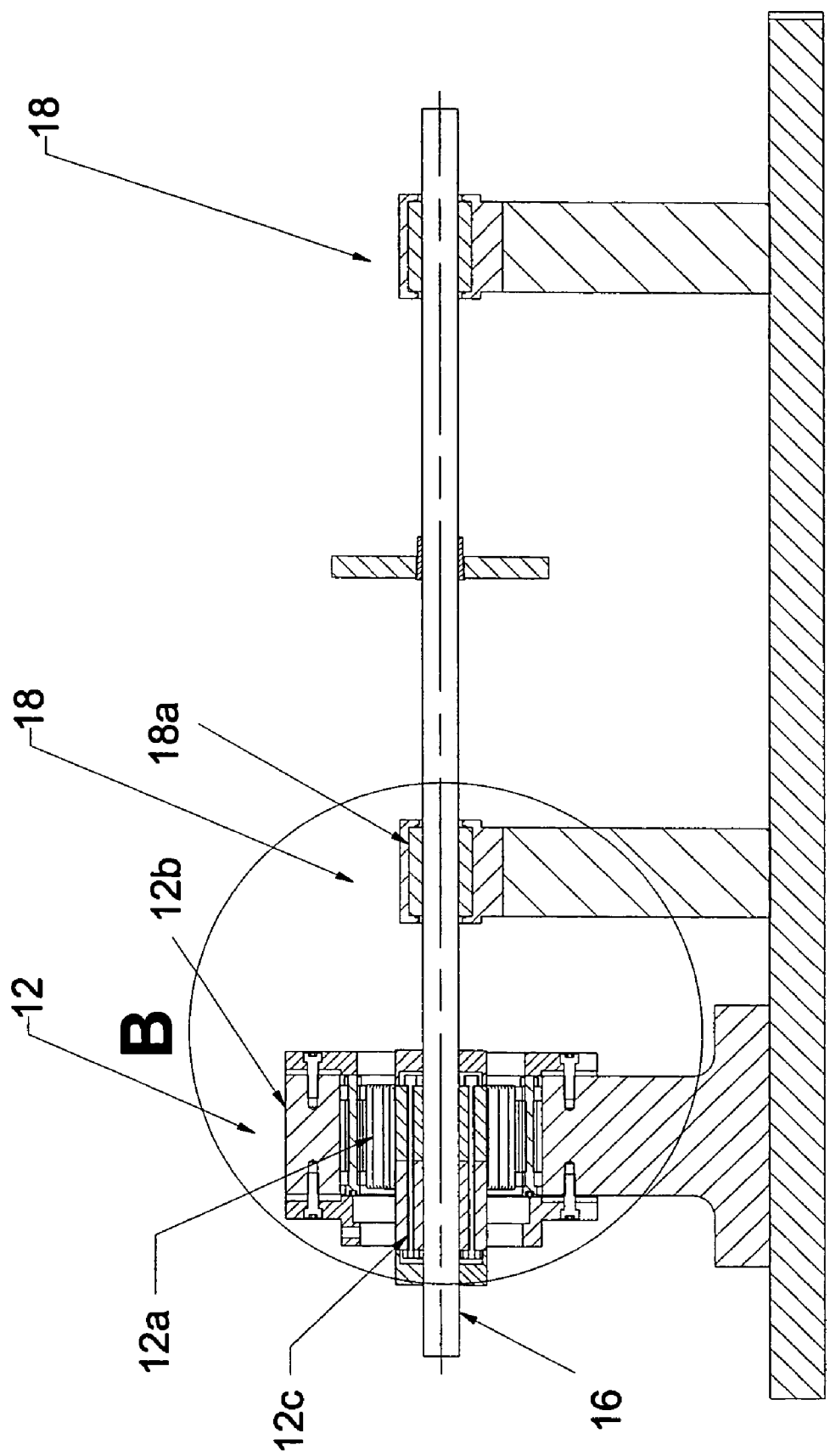
FIG. 2a is an elevation view of another embodiment of the invention depicting the non-adjacent magnetic-journal bearing support of a rotor, showing a cross-sectional view of the embodiment.
Figure 2B:
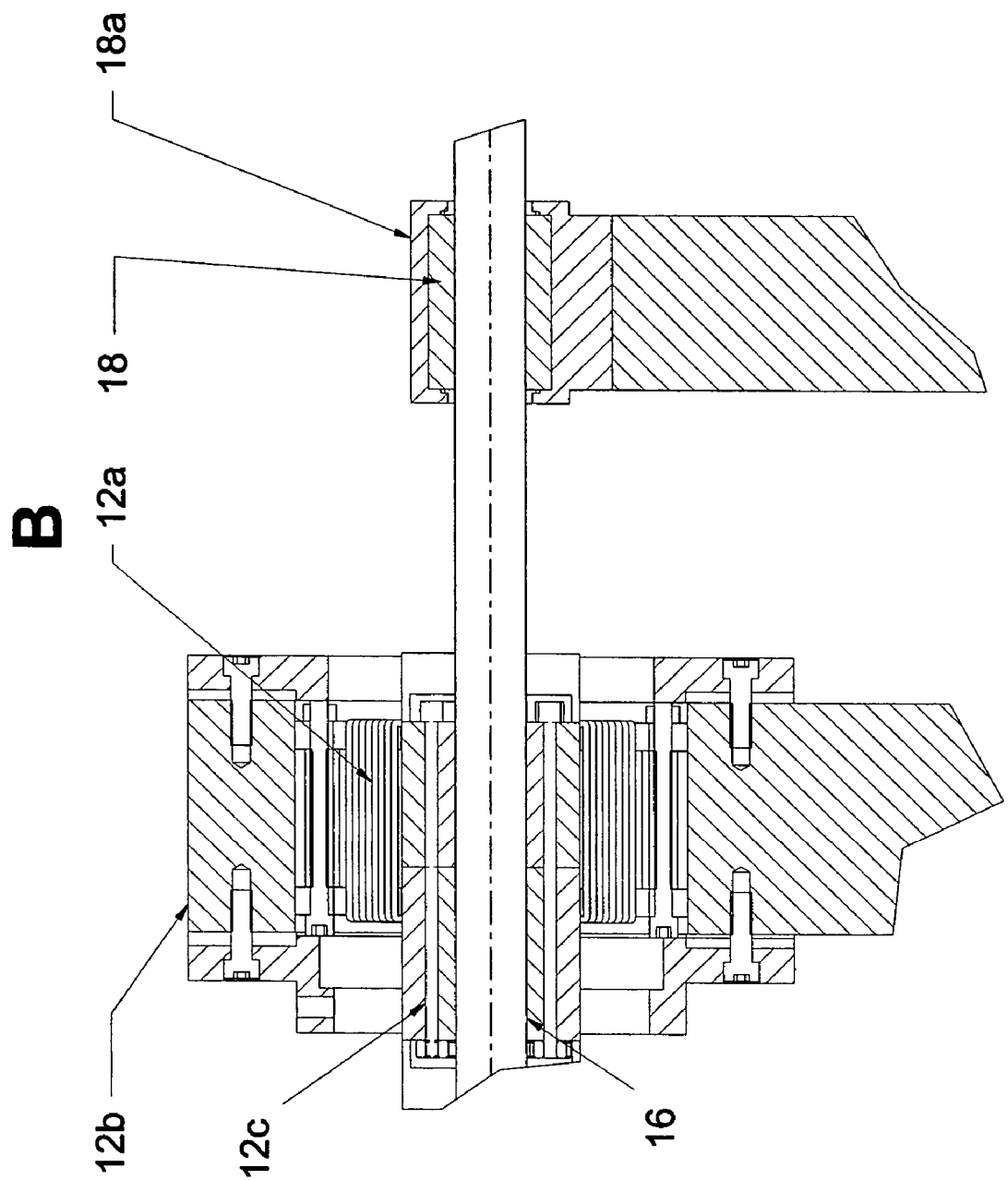
Figure 3:
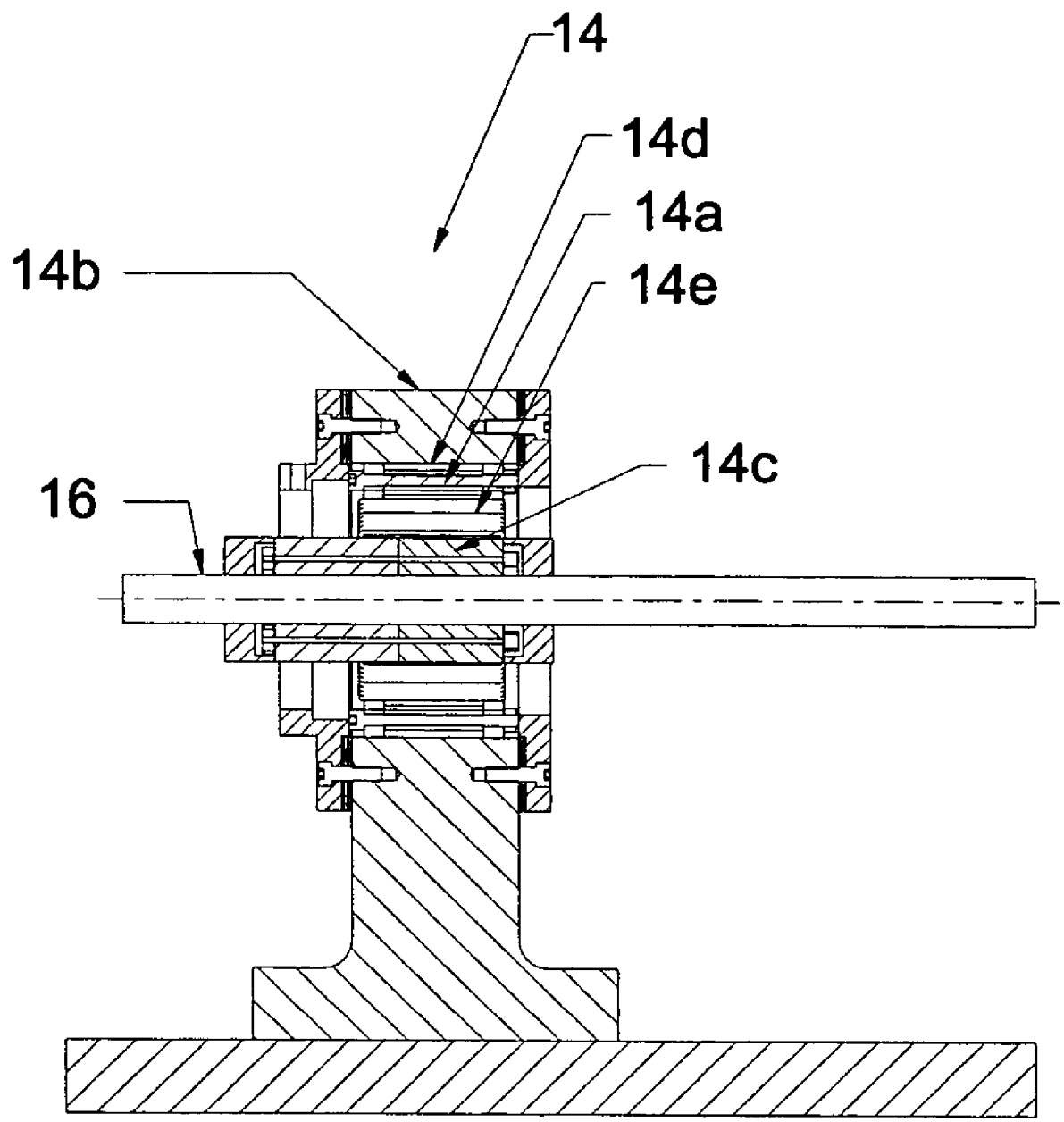
FIG. 3 is an elevation view of another embodiment of the invention depicting an integrated magnetic-journal bearing, showing a cross-sectional view of the embodiment.

Now referring to the drawings, FIGS. 1 to 3 depict the various embodiments of the combined Magnetic Bearing-Fluid Film Bearing invention, in the Adjacent, Non-Adjacent and Integral embodiments, respectively.

FIG. 1 shows the configuration of the Adjacent Magnetic Bearing—Fluid Film Bearing configuration. The elevation view is shown in FIG. 1, where a magnetic bearing assembly 12 comprising an electromagnetic stator 12a is fixed in a housing 12b, and is used to control the rotor 12c, mounted on the shaft 16. The load carrying element is the fluid film bearing assembly 18, supported by the housing 18a. The load is carried by the fluid film bearing 18, while the magnetic bearing 12 is used to control the instability that occurs in the fluid film bearing 18 at high speeds.

FIGS. 2a-2b show the configuration of the Non-Adjacent Magnetic Bearing—Fluid Film Bearing configuration. FIG. 2a shows the elevation view, where a magnetic bearing assembly 12 comprising an electromagnetic stator 12a is fixed in a housing 12b, and is used to control the rotor 12c, mounted on the shaft 16. The load-carrying element is the fluid film bearing assembly 18, supported by the housing 18a. The load is carried by the fluid film bearing 18, while the magnetic bearing 12 is used to control the instability that occurs in the fluid film bearing 18 at high speeds. FIG. 2b shows the detail of the magnetic bearing stator 12a with windings, rotor 12c, housing 12b and shaft 16. The main difference between FIG. 1 and FIG. 2 is that in FIG. 1, the Magnetic Bearing and the Fluid Film Bearing are adjacent (close to each other); while in FIG. 2, the Magnetic Bearing and the Fluid Film Bearing are non-adjacent (relatively far or distantly spaced-apart from each other).

FIG. 3 shows the configuration of the Integral Magnetic Bearing—Fluid Film Bearing assembly 14 configuration. The elevation view is shown in FIG. 3, where a magnetic bearing 14d comprising an electromagnetic stator 14a is fixed in a housing 14b, and is used to control the rotor 14c, mounted on the shaft 16. The load carrying element is the fluid film bearing 14e, where the fluid film is filling the clearance between the stator 14a and the rotor 14c. The load is carried by the fluid film bearing 14e, while the magnetic bearing 14d is used to control the instability that occurs in the fluid film bearing 14e at high speeds. This is a compact configuration with the fluid film bearing 14e integrated into the magnetic bearing 14d.

FIGS. 4 to 18 depict the various examples of embodiments of the Stable Fluid Film Bearing, including the Vertically Inclined Fixed Geometry Bearing, the Horizontally Inclined Fixed Geometry Bearing, the Tilting Housing Bearing, the Upper Tilted Half Bearing, the Inclined Pressure Dam Bearing, the Inclined Multi-Lobed Bearing, the Converging-Diverging Bearing, the Diverging Converging Bearing, the Converging Bearing, the Diverging Bearing, and the Axially Tilting Pad Bearing and variants.

Figure 4B:
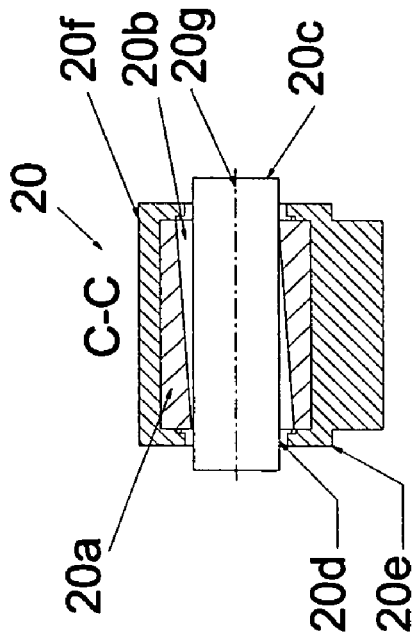
FIGS. 4a-4c collectively depict the vertically inclined fixed geometry assembly embodiment of the invention.
Figure 4A:
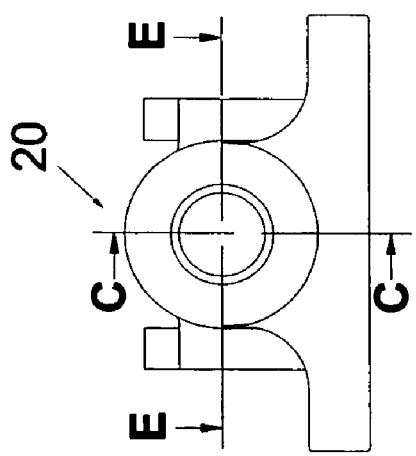
Figure 4C:
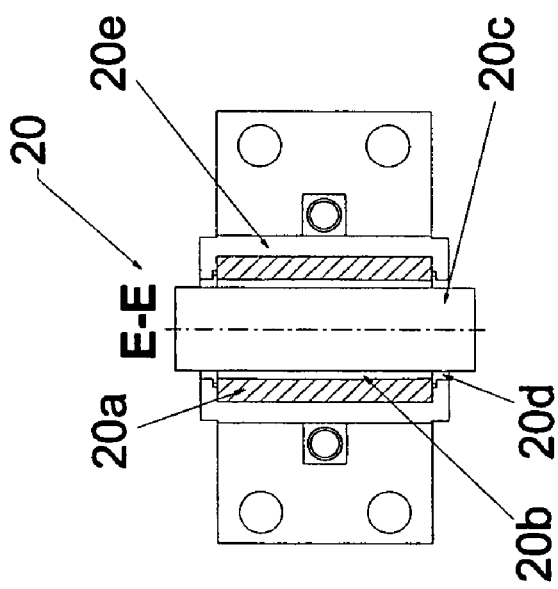

An example of the Vertically Inclined Fixed Geometry Bearing assembly 20 embodiment is shown in FIGS. 4a-4c. The bearing 20a is vertically inclined to promote the stability of the system (see section C-C, FIG. 4b). The fluid film 20b is carrying the shaft 20c, on the bearing 20a, and is sealed using the sealing 20d. The housing halves, housing lower part 20e and housing upper part 20f, are part of the bearing assembly 20 and carry the bearing 20a. The shaft axis 20g in this case for a horizontal machine would be horizontal, but the bearing itself is inclined vertically to promote stability.

Figure 5B:
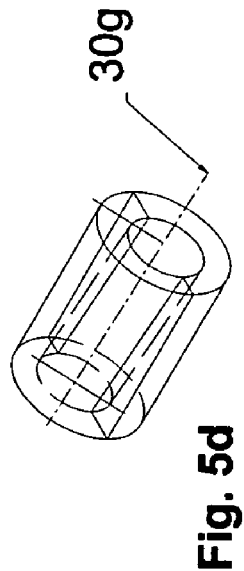
FIGS. 5a-5d collectively depict the horizontally inclined fixed geometry bearing assembly embodiment of the invention.
Figure 5D:
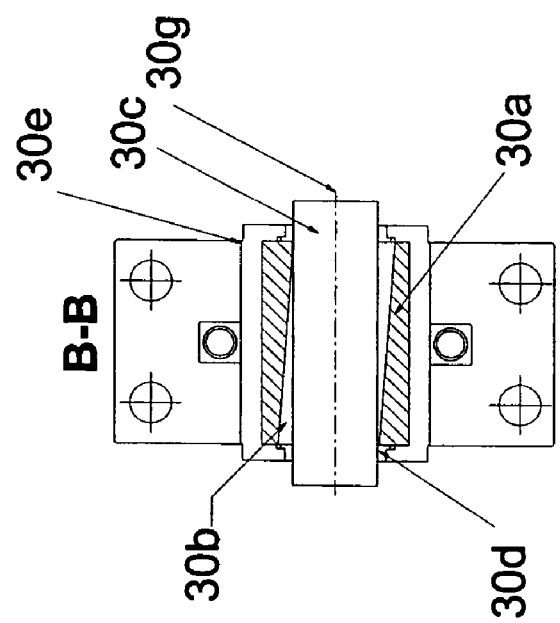
Figure 5A:
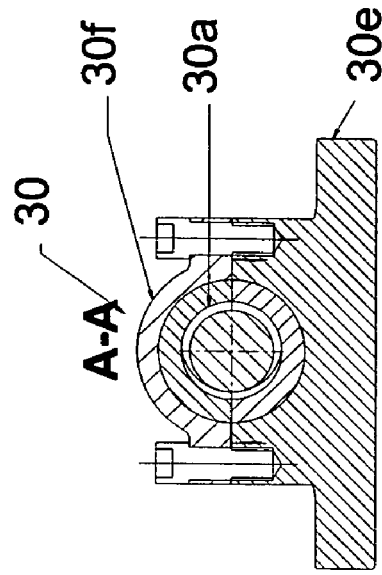
Figure 5C:
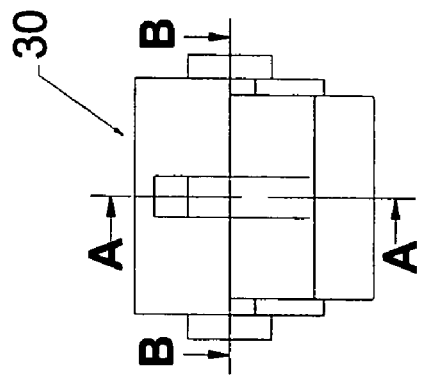

An example of the Horizontally Inclined Fixed Geometry Bearing assembly 30 embodiment is shown in FIGS. 5a-5d. The bearing 30a is horizontally inclined to promote the stability of the system (see section B-B, FIG. 5c). The fluid film 30b is carrying the shaft 30c, on the bearing 30a, and is sealed using the sealing 30d. The housing halves, housing lower part 30e and housing upper part 30f, are part of the bearing assembly 30 and carry the bearing 30a. FIG. 5d shows a schematic of the two bearing halves with the horizontal inclination. The shaft axis 30g in this case for a horizontal machine would be horizontal and the bearing itself is inclined horizontally to the machine axis to promote stability.

FIGS. 6a-6c show an example of the Tilting Housing Bearing assembly 40 embodiment. The bearing 40a is straight, and the housing, comprising housing lower part 40b and housing upper part 40c, is adjustable. Two bolts 40d, on each side, are used to fix the housing to the support. A curved groove in the housing parts 40b, 40c is used for the bolt 40d. By loosening the bolts 40d, it is possible to twist the housing parts 40b, 40c (and consequently the bearing 40a) with respect to the shaft 40e, and then tightening them again to fix the amount of twist as desired. This should lead to a stable bearing that can have the angular misalignment of the bearing adjusted.

Figure 7B:
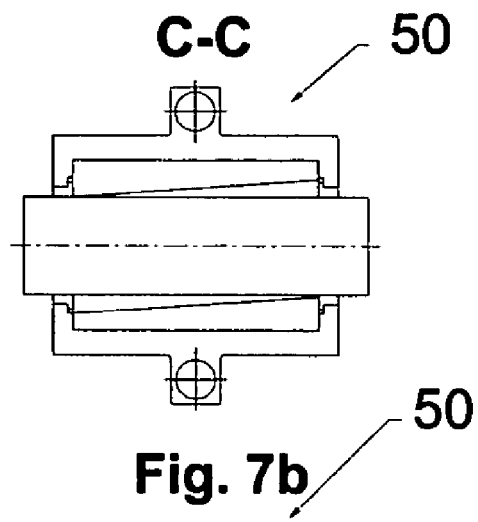
FIGS. 7a-7e collectively depict the upper tilting half bearing embodiment of the invention.
Figure 7A:
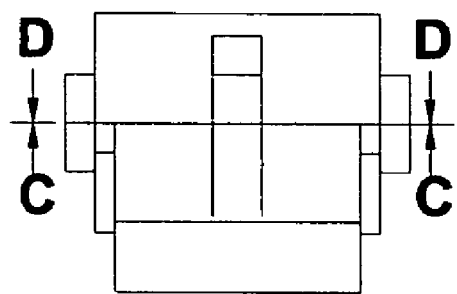
Figure 7C:
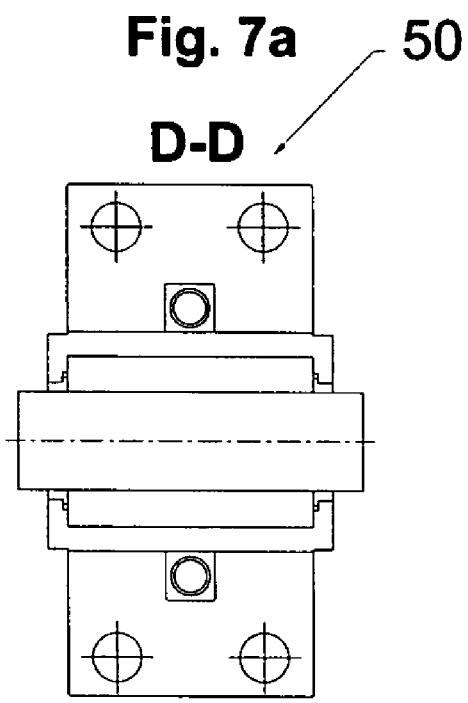
Figure 7D:
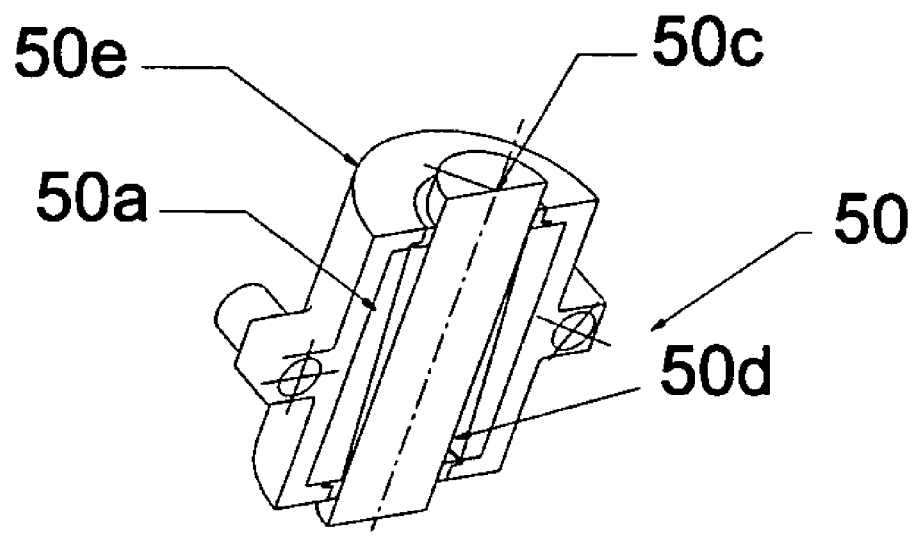
Figure 7E:
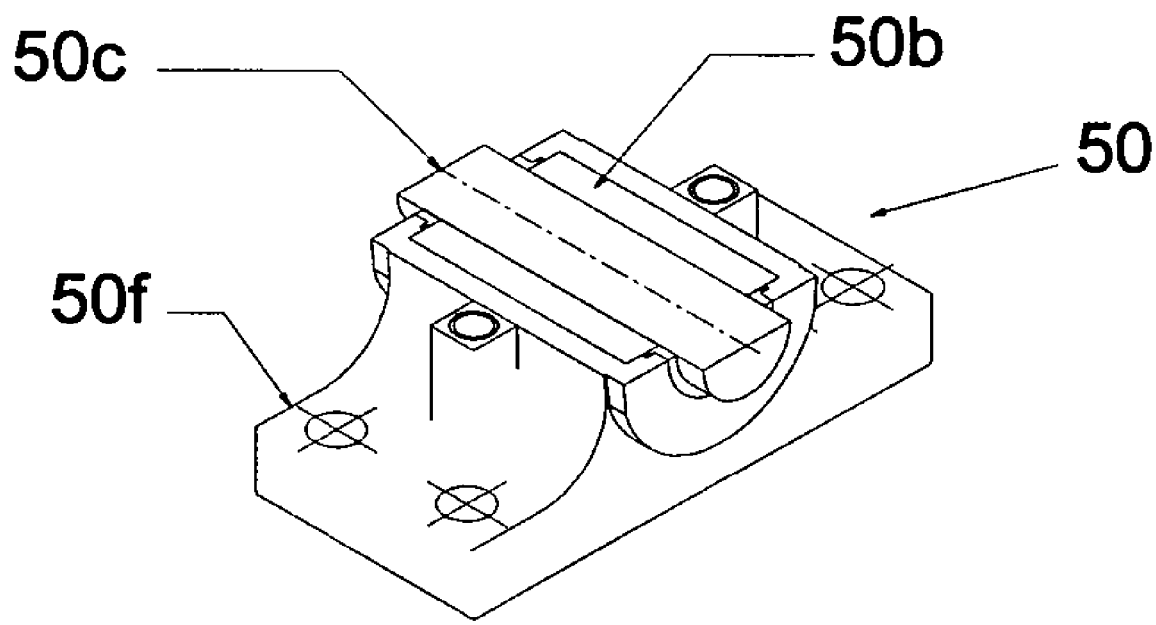

FIGS. 7a-7e show an example of the Upper Tilting Half Bearing assembly 50 embodiment. In this embodiment, only the upper bearing half 50a is tilted and misaligned to the shaft 50c axis, while the lower bearing half 50b is normal. This is best seen in FIGS. 7d and 7e. These latter two drawings further depict oil film 50d and housing upper and lower parts 50e,50f. Actually, the current technology allows for the upper half to be offset, however, the claimed invention is the upper half 50a tilted (axis skewed to shaft axis). Actually, the drawings provided are for a bearing that has an upper half 50a that is both offset and tilted.

Figure 8B:
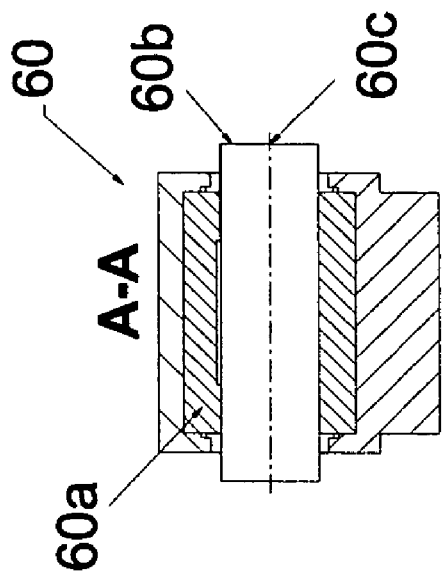
Figure 8A:
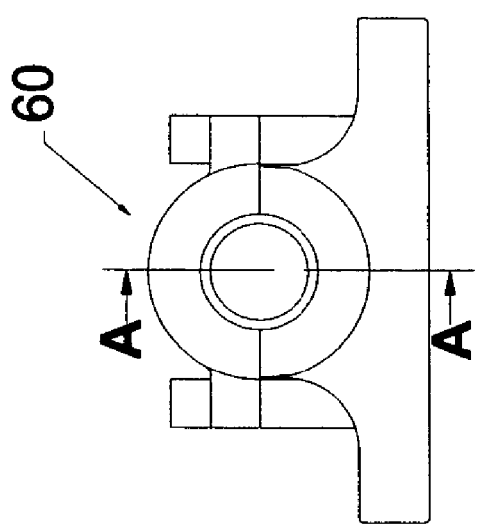
Figure 8C:
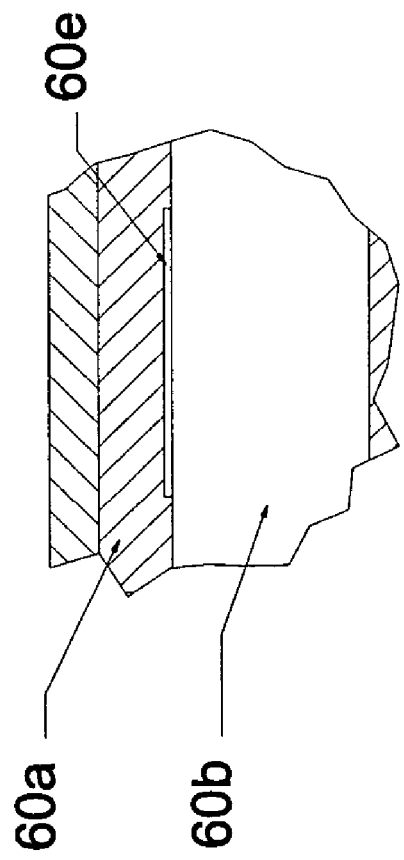
Figure 9B:
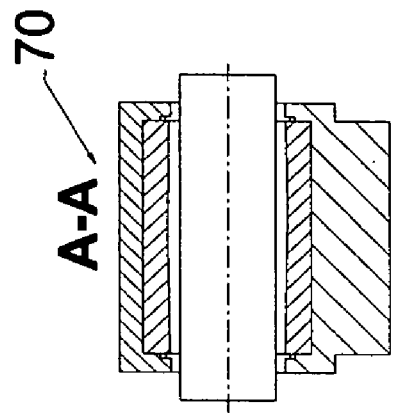
FIGS. 9a-9d collectively depict the inclined multi-lobe bearing embodiment of the invention.
Figure 9D:
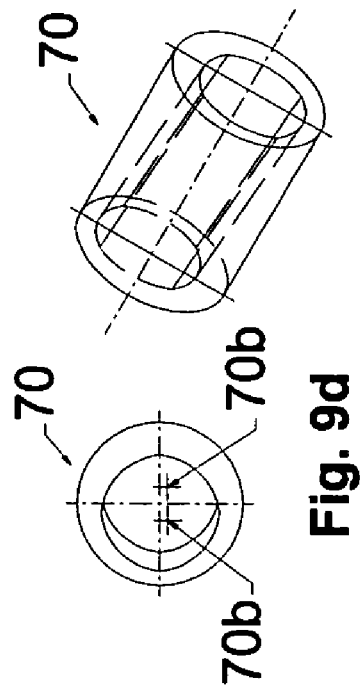
Figure 9A:
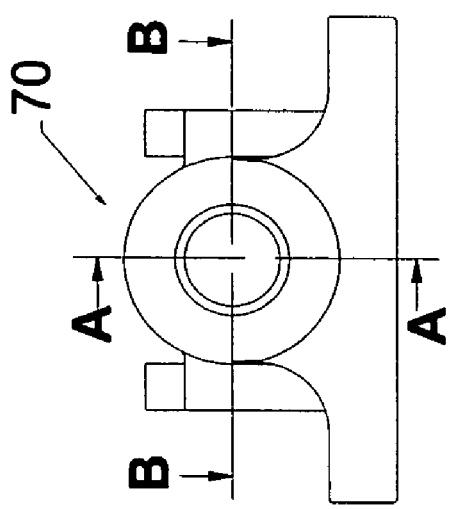
Figure 9C:
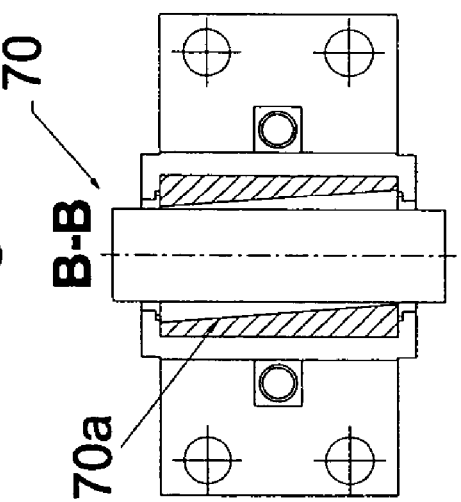
Figure 13B:
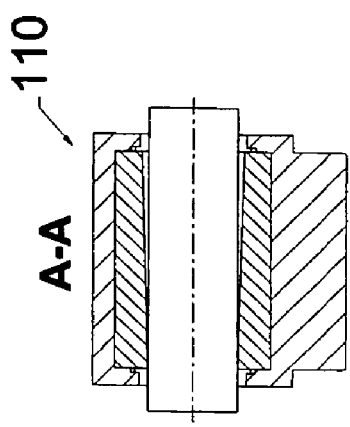
FIGS. 13a-13d collectively depict the divergent bearing assembly embodiment of the invention.
Figure 13D:
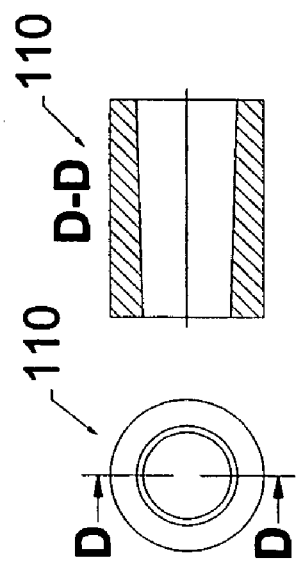
Figure 13A:
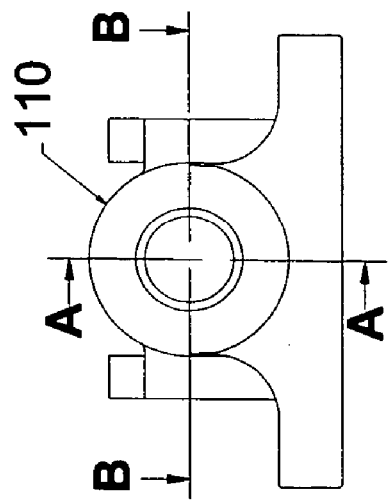
Figure 13C:
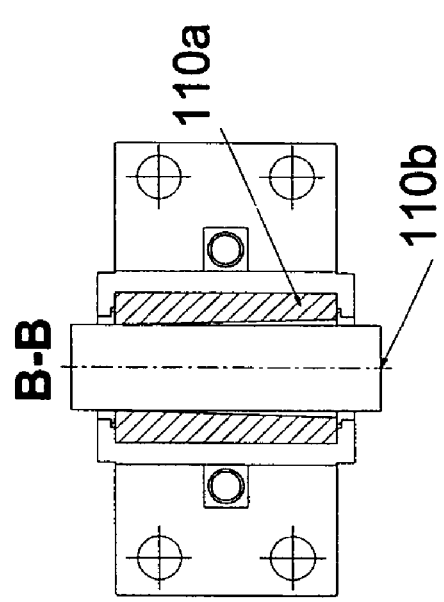

FIGS. 8a-8d show an example of the Inclined Pressure Dam Bearing assembly 60 embodiment. This bearing 60a is essentially a cylindrical bearing, but with a dam 60d. The purpose of the dam is to disturb the flow and load the bearing, thus improving its stability characteristics. The current technology allows for the dam. However, the invention claimed is in a dam that has its edges tilted with respect to the axis 60c of the shaft 60b, thus providing for the angular loading and axial flow disturbance. Section A-A of FIG. 8b, and enlarged in FIG. 8c show the dam. The oil film is shown as 60e in FIG. 8c. The details of the inclined dam are shown in FIG. 8d.

FIGS. 9a-9d show an example of the Inclined Multi-Lobe Bearing assembly 70 embodiment. The current technology allows for the multi-lobe bearing 70a to be consisting of several lobes, each lobe has its center of curvature in a different position, thus providing circumferential disturbance to the flow, and improving stability. This is in contrast to the cylindrical bearing, which has only one center. The multi-lobe bearing can have two-lobes (which is the elliptic bearing, in which the upper and lower halves have two different centers), three-lobes, four-lobes (as depicted in FIGS. 9a-9d), or more. Our claim for the invention is that not only that each lobe has its own center of curvature (see 70b in FIG. 9d), but also each lobe is tilted axially, such as to disturb the flow axially, as clearly illustrated in FIG. 9d, and the sections A-A and B-B shown in FIGS. 9b and 9c, respectively.

To complete the ideas for disturbing the flow axially, one can envision a convergent bearing, a divergent bearing, a convergent-divergent bearing, or a divergent-convergent bearing. There are no similar bearings in the current technology, but such embodiments can improve the stability through the axial flow disturbance.

As alluded to above, these embodiments are shown as follows: the Convergent-Divergent Bearing Assembly 80 (FIGS. 10a-10c), the Divergent-Convergent Bearing assembly 90 (FIGS. 11a-11d), the Convergent Bearing assembly 100 (FIGS. 12a-12d), and the Divergent Bearing assembly 110 (FIGS. 13a-13d). In all these bearing assemblies, the corresponding bearing 80a,90a,100a,110a, has the axial disturbance of the flow suggested by each of their names respectively, with respect to the respective shaft 80b,90b,100b,110b.

Figure 14B:
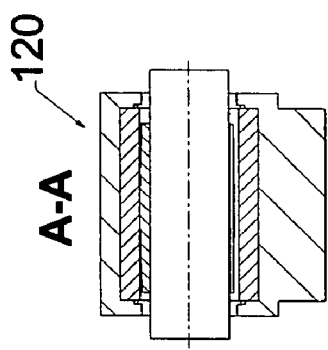
FIGS. 14a-14d collectively depict the tilting pad bearing embodiment of the invention.
Figure 14A:
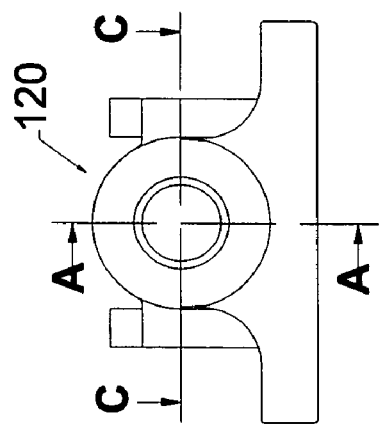
Figure 14D:
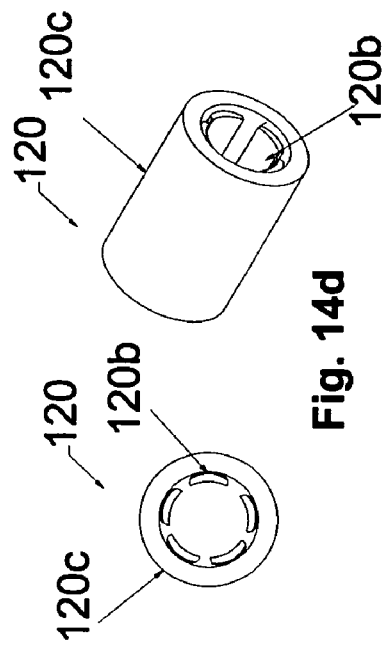
Figure 14C:
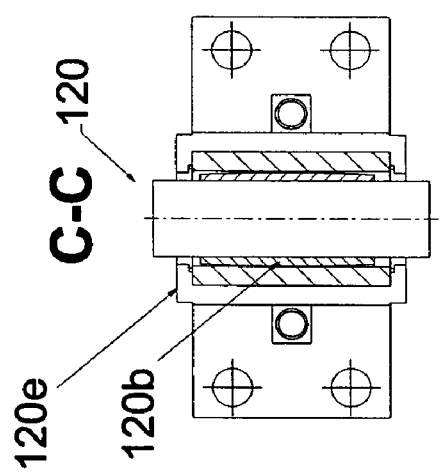

Another embodiment example is a tilting pad bearing assembly 120. These bearings are designed to have multiple pads 120b that essentially can rock circumferentially, thus disturbing the flow circumferentially. FIGS. 14a-14d representationally show this embodiment, which allows appreciable rocking in the axial direction, thus disturbing the flow axially. FIG. 14d shows the tilting pads 120b that are allowed to rock axially on the outer casing 120c.

To further accentuate the axial flow disturbance in tilting pad bearings, further embodiments of the invention are shown in FIGS. 15, 16, 17 and 18. FIGS. 15a-15d show a tilting pad bearing assembly 130 with a Divergent-Convergent pad 130b that rocks on the bearing 130c axially, and/or has an axial Divergent-Convergent profile, while FIGS. 16a-16d show a tilting pad bearing assembly 140 with a Convergent-Divergent pad 140b that rocks on the bearing 140c axially, and/or has an axial Convergent-Divergent profile. FIGS. 17a-17d show a tilting pad bearing assembly 150 with an axially twisted pad 150b, while FIGS. 18a-18d show a tilting pad bearing assembly 160 with an axially stepped pad 160b.

These embodiments are all different embodiments of the current invention that provide progressively enhanced stability by disturbing the axial flow.

The present invention can also be applied to foil bearings using the conceptual embodiments described above. The inventive configurations described above of axial flow disturbance can be applied to foil bearings, through axial flow disturbance, by twisting or tilting as discussed above.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A method of controlling the instability in fluid film bearings, including bearings used in high speed rotor or shaft assemblies, the method comprising:
    causing a twisting or tilting disturbance in an axial direction of a fluid which is subject to bearing load in a stand-alone fluid film bearing by modifying a bearing inner surface wherein a non-skewed shaft or rotor centerline is maintained,
    wherein a housing of a bearing assembly is adjustable, said adjustable housing being adjustable by loosening means and by twisting components of said housing to create the angular misalignment of said fluid film bearing with respect to the shaft or rotor axis.

2. The method according to claim 1 above, wherein the fluid film bearing is adapted such that a bearing axis of said fluid film bearing is skewed in relation to a shaft or rotor axis to create a misalignment at the fluid film bearing, said misalignment is such that misaligned surfaces of said fluid film bearing with respect to said shaft or rotor axis are not substantially parallel.

3. The method according to claim 1, wherein for a bearing with a horizontal axis, the bearing is a fixed geometry bearing and the misalignment of the bearing axis in relation to the shaft or rotor axis is either horizontal or vertical.

4. The method according to claim 1, wherein for a bearing with a vertical axis, the bearing is a fixed geometry bearing and the bearing axis is inclined in any of the perpendicular horizontal planes in relationship to the shaft rotor axis.

5. The method according to claim 1, wherein the fluid film bearing is a variable geometry bearing and the misalignment of the bearing axis in relation to the shaft or rotor axis is horizontal.

6. The method according to claim 5, wherein the variable geometry bearing is installed so as to provide a bearing angular misalignment in relationship to the shaft or rotor axis.

7. The method according to claim 1, wherein the angular misalignment of the bearing assembly is re-adjusted by adjusting the housing when required by bearing wear and shaft or rotor wear.

8. The method according to claim 1,
    wherein the fluid film bearing is comprised of two-halves, a lower bearing half and an upper bearing half, and
    wherein the lower bearing half is aligned with the shaft or rotor axis and the upper bearing half is skewed to the shaft or rotor axis.

9. The method according to claim 8, wherein the upper bearing half is tilted to create the angular misalignment of the upper bearing half with respect to the shaft or rotor axis.

10. The method according to claim 1,
    wherein the fluid film bearing is comprised of two-halves, a lower bearing half and an upper bearing half, and
    wherein the upper bearing half is aligned with the shaft or rotor axis and the lower bearing half is skewed to the shaft or rotor axis.

11. The method according to claim 10, wherein the lower bearing half is tilted to create the angular misalignment of the lower bearing half with respect to the shaft or rotor axis.

12. The method according to claim 1, wherein the fluid film bearing is essentially cylindrically-shaped and includes a dam having its edges tilted with respect to the shaft or rotor axis to provide for an axial fluid film flow disturbance.

13. The method according to claim 12, wherein the fluid film bearing with its dam is an inclined pressure dam bearing assembly.

14. The method according to claim 1, wherein the fluid film bearing is a multi-lobe shaped bearing assembly, each lobe having its own center of curvature in a different position and each lobe is tilted axially to disturb the flow axially of the fluid film, such that a lobe surface of said each lobe is not substantially parallel to a shaft or rotor axis.

15. The method according to claim 1, wherein the fluid film bearing in relation to a shaft or rotor is one of:
    divergent shaped;
    convergent shaped;
    divergent-convergent shaped; and
    convergent-divergent shaped.

16. The method according to claim 1, wherein the fluid film bearing includes two or more pads adapted to rock circumferentially and axially between the bearing and the shaft or rotor to disturb the fluid film flow circumferentially and axially.

17. The method according to claim 16, wherein the two or more pads are tilted in relation to the shaft or rotor axis.

18. The method according to claim 16, wherein the two or more pads have a convergent-divergent profile.

19. The method according to claim 16, wherein the two or more pads have a divergent-convergent profile.

20. The method according to claim 16, wherein the two or more pads are twisted axially.

21. The method according to claim 16, wherein the two or more pads are axially stepped pads.

22. The method according to claim 1, wherein the fluid film bearing is a foil bearing.

23. A method of controlling the instability in fluid film bearings, including bearings used in high speed rotor or shaft assemblies, the method comprising:
    causing a disturbance in an axial direction of a fluid in a fluid film bearing, which is subject to bearing load, said fluid film bearing being a stand alone bearing which is part of a fluid film radial bearing assembly said disturbance being caused by modifying a bearing inner surface wherein a non-skewed shaft or rotor centerline is maintained,
    wherein the fluid film bearing is adapted such that a bearing axis of said fluid film bearing is tilted in relation to a shaft or rotor axis to create a misalignment at the fluid film bearing,
    wherein the fluid film bearing is a variable geometry bearing and the misalignment of the fluid film bearing axis in relation to the shaft or rotor axis is horizontal, and
    wherein a housing of a bearing assembly is adjustable, said adjustable housing being adjustable by loosening means and by twisting components of said housing to create the angular misalignment of said fluid film bearing with respect to the shaft or rotor axis.

24. The method according to claim 23, wherein for a fluid film bearing with a horizontal axis, the misalignment of the fluid film bearing axis in relation to the shaft or rotor axis is either horizontal or vertical.

25. The method according to claim 23, wherein for a fluid film bearing with a vertical axis, the bearing axis is inclined in any of the perpendicular horizontal planes in relationship to the shaft or rotor axis.

26. The method according to claim 23, wherein the variable geometry bearing is installed so as to provide a bearing angular misalignment in relationship to the shaft or rotor axis.

27. The method according to claim 23, wherein the fluid film bearing is a foil bearing.

28. A method of controlling the instability in fluid film bearings, including bearings used in high speed rotor or shaft assemblies, the method comprising:
causing a disturbance in an axial direction of a fluid in a fluid film bearing, which is subject to bearing load, said fluid film bearing being a stand alone bearing which is part of a fluid film radial bearing assembly,
wherein the fluid film bearing is adapted such that a bearing axis of said fluid film bearing is tilted in relation to a shaft or rotor axis to create a misalignment at the fluid film bearing, and
wherein a housing of said bearing assembly is adjustable, said adjustable housing being adjustable by loosening means and by twisting components of said housing to create the angular misalignment of the bearing assembly with respect to the shaft or rotor axis.

29. The method according to claim 28, wherein for a fluid film bearing with a horizontal axis, the misalignment of the fluid film bearing axis in relation to the shaft or rotor axis is either horizontal or vertical.

30. The method according to claim 28, wherein for a fluid film bearing with a vertical axis, the bearing axis is inclined in any of the perpendicular horizontal planes in relationship to the shaft rotor axis.

31. The method according to claim 28, wherein the angular misalignment of the bearing assembly is re-adjusted by adjusting the housing when required by bearing wear and shaft or rotor wear.

32. The method according to claim 28, wherein the fluid film bearing is a foil bearing.

33. A method of controlling the instability in fluid film bearings, including bearings used in high speed rotor or shaft assemblies, the method comprising:
causing a disturbance in an axial direction of a fluid in a fluid film bearing, which is subject to bearing load,
wherein a fluid film radial bearing assembly is comprised of two-halves, a lower bearing half and an upper bearing half, and
wherein the lower bearing half is aligned with the shaft or rotor axis and the upper bearing half is skewed to the shaft or rotor axis.

34. The method according to claim 33, wherein the upper bearing half is tilted to create the angular misalignment of the upper bearing half with respect to the shaft or rotor axis.

35. The method according to claim 33 above, wherein the fluid film bearing is adapted such that a bearing axis of said fluid film bearing is tilted in relation to a shaft or rotor axis to create a misalignment at the fluid film bearing.

36. The method according to claim 35, wherein for a fluid film bearing with a horizontal axis, the fluid film bearing is a fixed geometry bearing and the misalignment of the fluid film bearing axis in relation to the shaft or rotor axis is either horizontal or vertical.

37. The method according to claim 35, wherein for a fluid film bearing with a vertical axis, the fluid film bearing is a fixed geometry bearing and the bearing axis is inclined in any of the perpendicular horizontal planes in relationship to the shaft rotor axis.

38. The method according to claim 33, wherein the fluid film bearing is a foil bearing.

39. A method of controlling the instability in fluid film bearings, including bearings used in high speed rotor or shaft assemblies, the method comprising:
causing a disturbance in an axial direction of a fluid in a fluid film bearing, which is subject to bearing load,
wherein the fluid film bearing is comprised of two-halves, a lower bearing half and an upper bearing half, and
wherein the upper bearing half is aligned with the shaft or rotor axis and the lower bearing half is skewed to the shaft or rotor axis.

40. The method according to claim 39, wherein the fluid film bearing is adapted such that a bearing axis of said fluid film bearing is tilted in relation to a shaft or rotor axis to create a misalignment at the fluid film bearing.

41. The method according to claim 40, wherein for a fluid film bearing with a horizontal axis, the fluid film bearing is a fixed geometry bearing and the misalignment of the fluid film bearing axis in relation to the shaft or rotor axis is either horizontal or vertical.

42. The method according to claim 40, wherein for a fluid film bearing with a vertical axis, the fluid film bearing is a fixed geometry bearing and the bearing axis is inclined in any of the perpendicular horizontal planes in relationship to the shaft rotor axis.

43. The method according to claim 39, wherein the lower bearing half is tilted to create the angular misalignment of the lower bearing half with respect to the shaft or rotor axis.

44. The method according to claim 39, wherein the fluid film bearing is a foil bearing.

45. A method of controlling the instability in fluid film bearings, including bearings used in high speed rotor or shaft assemblies, the method comprising:
causing a disturbance in an axial direction of a fluid in a fluid film bearing, which is subject to bearing load,
wherein the fluid film bearing is essentially cylindrically-shaped and includes a dam having its edges tilted with respect to the shaft or rotor axis to provide for an axial fluid film flow disturbance.

46. The method according to claim 45, wherein the fluid film bearing is adapted such that a bearing axis of said fluid film bearing is tilted in relation to a shaft or rotor axis to create a misalignment at the fluid film bearing.

47. The method according to claim 46, wherein for a fluid film bearing with a horizontal axis, the fluid film bearing is a fixed geometry bearing and the misalignment of the fluid film bearing axis in relation to the shaft or rotor axis is either horizontal or vertical.

48. The method according to claim 46, wherein for a fluid film bearing with a vertical axis, the fluid film bearing is a fixed geometry bearing and the bearing axis is inclined in any of the perpendicular horizontal planes in relationship to the shaft rotor axis.

49. The method according to claim 45, wherein the fluid film bearing with its dam is an inclined pressure dam bearing assembly.

50. The method according to claim 45, wherein the fluid film bearing is a foil bearing.

51. A method of controlling the instability in fluid film bearings, including bearings used in high speed rotor or shaft assemblies, the method comprising:

causing a disturbance in an axial direction of a fluid in a fluid film bearing, which is subject to bearing load, wherein the fluid film bearing in relation to the shaft or rotor is one of:

divergent shaped;

convergent shaped;

divergent-convergent shaped; and convergent-divergent shaped.

52. The method according to claim 51 above, wherein the fluid film bearing is adapted such that a bearing axis of said fluid film bearing is tilted in relation to a shaft or rotor axis to create a misalignment at the fluid film bearing.

53. The method according to claim 52, wherein for a fluid film bearing with a horizontal axis, the fluid film bearing is a fixed geometry bearing and the misalignment of the fluid film bearing axis in relation to the shaft or rotor axis is either horizontal or vertical.

54. The method according to claim 52, wherein for a fluid film bearing with a vertical axis, the fluid film bearing is a fixed geometry bearing and the bearing axis is inclined in any of the perpendicular horizontal planes in relationship to the shaft rotor axis.

55. The method according to claim 51, wherein the fluid film bearing is a foil bearing.

56. A method of controlling the instability in fluid film bearings, including bearings used in high speed rotor or shaft assemblies, the method comprising:

causing a disturbance in an axial direction of a fluid in a fluid film bearing, which is subject to bearing load, wherein the fluid film bearing includes two or more pads adapted to rock circumferentially and axially between the bearing and the shaft or rotor to disturb the fluid film flow circumferentially and axially.

57. The method according to claim 56 above, wherein the fluid film bearing is adapted such that a bearing axis of said fluid film bearing is tilted in relation to a shaft or rotor axis to create a misalignment at the fluid film bearing.

58. The method according to claim 57, wherein for a fluid film bearing with a horizontal axis, the fluid film bearing is a fixed geometry bearing and the misalignment of the fluid film bearing axis in relation to the shaft or rotor axis is either horizontal or vertical.

59. The method according to claim 57, wherein for a fluid film bearing with a vertical axis, the fluid film bearing is a fixed geometry bearing and the bearing axis is inclined in any of the perpendicular horizontal planes in relationship to the shaft rotor axis.

60. The method according to claim 56, wherein the two or more pads are tilted in relation to the shaft or rotor axis.

61. The method according to claim 56, wherein the two or more pads have a convergent-divergent profile.

62. The method according to claim 56, wherein the two or more pads have a divergent-convergent profile.

63. The method according to claim 56, wherein the two or more pads are twisted axially.

64. The method according to claim 56, wherein the two or more pads are axially stepped pads.

65. The method according to claim 56, wherein the fluid film bearing is a foil bearing.

66. A method of controlling the instability in fluid film bearings, including bearings used in high speed rotor or shaft assemblies, the method comprising:

causing a disturbance in an axial direction of a fluid in a fluid film bearing, which is subject to bearing load, wherein the fluid film bearing is a multi-lobe shaped bearing assembly, each lobe having its own center of curvature in a different position and each lobe is tilted axially to disturb the flow axially of the fluid film, such that a lobe surface of said each lobe is not substantially parallel to a shaft or rotor axis.

67. The method according to claim 66, wherein the fluid film bearing is adapted such that a bearing axis of said fluid film bearing is tilted in relation to a shaft or rotor axis to create a misalignment at the fluid film bearing.

68. The method according to claim 67, wherein for a fluid film bearing with a horizontal axis, the fluid film bearing is a fixed geometry bearing and the misalignment of the fluid film bearing axis in relation to the shaft or rotor axis is either horizontal or vertical.

69. The method according to claim 67, wherein for a fluid film bearing with a vertical axis, the fluid film bearing is a fixed geometry bearing and the bearing axis is inclined in any of the perpendicular horizontal planes in relationship to the shaft rotor axis.

70. The method according to claim 66, wherein the fluid film bearing is a foil bearing.

* * * * *